United States Patent
Lawler et al.

(10) Patent No.: US 12,255,514 B2
(45) Date of Patent: Mar. 18, 2025

(54) SYSTEMS AND METHODS FOR FLEXURE-BASED BEARING MOUNTING

(71) Applicant: Mainspring Energy, Inc., Menlo Park, CA (US)

(72) Inventors: John Lawler, Portland, OR (US); Neil Watters, Redwood City, CA (US); Samuel Sherman, San Francisco, CA (US); Matthew Svrcek, Redwood City, CA (US); David DeGraaff, Mountain View, CA (US)

(73) Assignee: Mainspring Energy, Inc., Menlo Park, CA (US)

( * ) Notice: Subject to any disclaimer, the term of this patent is extended or adjusted under 35 U.S.C. 154(b) by 321 days.

(21) Appl. No.: 17/876,992

(22) Filed: Jul. 29, 2022

(65) Prior Publication Data

US 2023/0034504 A1    Feb. 2, 2023

Related U.S. Application Data

(60) Provisional application No. 63/227,780, filed on Jul. 30, 2021.

(51) Int. Cl.
*H02K 5/167* (2006.01)
*F16C 32/06* (2006.01)
*H02K 7/18* (2006.01)

(52) U.S. Cl.
CPC ......... *H02K 5/167* (2013.01); *F16C 32/0614* (2013.01); *H02K 7/1884* (2013.01)

(58) Field of Classification Search
CPC ........ H02K 5/167; H02K 7/1884; H02K 5/16; H02K 7/08; H02K 41/03; F16C 32/0614;
(Continued)

(56) References Cited

U.S. PATENT DOCUMENTS

| | | |
|---|---|---|
| 1,867,718 A | 7/1932 | Towell |
| 2,413,751 A | 1/1947 | Wolcott |

(Continued)

FOREIGN PATENT DOCUMENTS

| | | |
|---|---|---|
| CN | 1620546 A | 5/2005 |
| DE | 10013045 A1 | 9/2001 |

(Continued)

OTHER PUBLICATIONS

Schreiber, "Development Considerations on the Free-Piston Stirling Power Converter for Use in Space," NASA/TM (May 2007) 214805; 39 pgs.

(Continued)

*Primary Examiner* — Tulsidas C Patel
*Assistant Examiner* — Joshua Kiel M Rodriguez
(74) *Attorney, Agent, or Firm* — HALEY GUILIANO LLP

(57) ABSTRACT

A bearing assembly for a linear electromagnetic machine includes a sleeve having a surface configured to provide a bearing between the surface and a translator, a front plate coupled to the sleeve, a support block, and a plurality of flexures coupled to the support block. Each flexure is coupled between the support block and one of the front plate or a stator. For example, a load path extends from a stator to the support block via a first set of flexures of the plurality of flexures, from the support block to the front plate via a second set of flexures of the plurality of flexures, and from the front plate to the sleeve. In the example of four flexures, two flexures are affixed to the support block and front plate, while two other flexures are affixed to the support block and the stator.

15 Claims, 14 Drawing Sheets

(58) Field of Classification Search
CPC .. F16C 29/025; F16C 29/002; F16C 2380/26; F16C 32/0622
See application file for complete search history.

(56) References Cited

U.S. PATENT DOCUMENTS

| | | |
|---|---|---|
| 2,449,297 A | 9/1948 | Hoffer |
| 2,567,042 A | 9/1951 | Wemp |
| 2,814,551 A | 11/1957 | Jan et al. |
| 3,001,609 A | 9/1961 | Macks |
| 3,225,617 A | 12/1965 | Young |
| 3,538,815 A | 11/1970 | Clarke et al. |
| 3,548,721 A | 12/1970 | Eisennegger |
| 3,588,291 A | 6/1971 | Curwen et al. |
| 3,653,303 A | 4/1972 | Zurcher |
| 3,749,066 A | 7/1973 | Cseh |
| 3,777,621 A | 12/1973 | Blok et al. |
| 3,777,722 A | 12/1973 | Lenger |
| 3,779,672 A | 12/1973 | Schroeder |
| 3,859,971 A | 1/1975 | Rauen |
| 3,956,895 A | 5/1976 | Noble et al. |
| 4,048,975 A | 9/1977 | Urquhart |
| 4,069,794 A | 1/1978 | Jordan |
| 4,111,104 A | 9/1978 | Davison, Jr. |
| 4,135,723 A | 1/1979 | Urquhart |
| 4,137,015 A | 1/1979 | Grossman |
| 4,304,410 A | 12/1981 | Erickson et al. |
| 4,308,720 A | 1/1982 | Brandstadter |
| 4,455,974 A | 6/1984 | Shapiro et al. |
| 4,470,375 A | 9/1984 | Showalter |
| 4,493,292 A | 1/1985 | Showalter |
| 4,522,163 A | 6/1985 | Hooper |
| 4,545,738 A | 10/1985 | Young |
| 4,627,795 A | 12/1986 | Schmitz-Montz |
| 4,644,851 A | 2/1987 | Young |
| 4,719,846 A | 1/1988 | Langstroth |
| 4,776,260 A | 10/1988 | Vincze |
| 4,776,261 A | 10/1988 | Larson |
| 4,799,421 A | 1/1989 | Bremer et al. |
| 4,846,051 A | 7/1989 | Wade et al. |
| 4,854,156 A | 8/1989 | Hoeffel et al. |
| 4,876,991 A | 10/1989 | Galitello, Jr. |
| 4,889,039 A | 12/1989 | Miller |
| 4,932,313 A | 6/1990 | Gutknecht |
| 5,030,182 A | 7/1991 | Frost |
| 5,140,905 A | 8/1992 | Dhar |
| 5,174,728 A | 12/1992 | Kimura et al. |
| 5,313,875 A | 5/1994 | Kadlicko |
| 5,454,351 A | 10/1995 | Cao et al. |
| 5,775,273 A | 7/1998 | Beale |
| 5,832,880 A | 11/1998 | Dickey |
| 5,967,017 A | 10/1999 | Hooke et al. |
| 6,016,738 A | 1/2000 | Elferink et al. |
| 6,035,637 A | 3/2000 | Beale et al. |
| 6,065,440 A | 5/2000 | Pasquan |
| 6,170,442 B1 | 1/2001 | Beale |
| 6,199,519 B1 | 3/2001 | Van Blarigan |
| 6,276,313 B1 | 8/2001 | Yang et al. |
| 6,293,184 B1 | 9/2001 | Unger |
| 6,313,552 B1 | 11/2001 | Boast |
| 6,314,924 B1 | 11/2001 | Berlinger |
| 6,378,875 B1 | 4/2002 | Feistel |
| 6,428,210 B1 | 8/2002 | Kafai |
| 6,532,916 B2 | 3/2003 | Kerrebrock |
| 6,541,875 B1 | 4/2003 | Berlinger et al. |
| 6,901,845 B2 | 6/2005 | Kiikka |
| 6,945,202 B2 | 9/2005 | Kaneko et al. |
| 7,052,182 B2 | 5/2006 | Shinohara et al. |
| 7,082,909 B2 | 8/2006 | Graf et al. |
| 7,104,227 B2 | 9/2006 | Roberts |
| 7,311,036 B2 | 12/2007 | Uchino |
| 7,438,027 B1 | 10/2008 | Hinderks |
| 7,469,664 B2 | 12/2008 | Hofbauer et al. |
| 7,470,065 B2 | 12/2008 | Stadlmayr et al. |
| 7,600,464 B2 | 10/2009 | Cale et al. |
| 7,622,814 B2 | 11/2009 | Hyde et al. |
| 7,624,574 B2 | 12/2009 | Sawada et al. |
| 7,640,910 B2 | 1/2010 | Lemke et al. |
| 7,784,436 B2 | 8/2010 | Lemke et al. |
| 7,861,679 B2 | 1/2011 | Lemke et al. |
| 8,040,011 B2 | 10/2011 | Mueller et al. |
| 8,053,937 B2 | 11/2011 | Nakano et al. |
| 8,402,931 B2 | 3/2013 | Simpson et al. |
| 8,413,617 B2 | 4/2013 | Simpson et al. |
| 8,601,988 B2 | 12/2013 | Graef |
| 8,607,560 B2 | 12/2013 | Fiedler |
| 9,657,675 B1 | 5/2017 | Roelle et al. |
| 2002/0139323 A1 | 10/2002 | Kerrebrock |
| 2003/0111914 A1 | 6/2003 | Miyagawa et al. |
| 2004/0025502 A1 | 2/2004 | Okano et al. |
| 2004/0123817 A1 | 7/2004 | Kiriljuk |
| 2004/0255882 A1 | 12/2004 | Branyon et al. |
| 2005/0081804 A1 | 4/2005 | Graf et al. |
| 2005/0172800 A1 | 8/2005 | Uchino |
| 2005/0223531 A1 | 10/2005 | Wiseman et al. |
| 2006/0157003 A1 | 7/2006 | Lemke et al. |
| 2006/0185631 A1 | 8/2006 | Fitzgerald |
| 2006/0207249 A1 | 9/2006 | Yaguchi et al. |
| 2007/0110347 A1* | 5/2007 | Sato .............. F16C 32/0603 384/100 |
| 2007/0215093 A1 | 9/2007 | Lemke et al. |
| 2008/0078288 A1 | 4/2008 | Heidrich et al. |
| 2008/0141921 A1 | 6/2008 | Hinderks |
| 2008/0271711 A1 | 11/2008 | Cheeseman |
| 2009/0095260 A1 | 4/2009 | Marchetti |
| 2009/0101005 A1 | 4/2009 | Pohl et al. |
| 2009/0179424 A1 | 7/2009 | Yaron |
| 2009/0199821 A1 | 8/2009 | Marchetti |
| 2009/0217658 A1 | 9/2009 | Fiedler |
| 2009/0271088 A1 | 10/2009 | Langham |
| 2009/0277516 A1 | 11/2009 | Winkler et al. |
| 2009/0302692 A1 | 12/2009 | Tang et al. |
| 2010/0109343 A1 | 5/2010 | Lemke et al. |
| 2010/0162998 A1 | 7/2010 | Graef |
| 2010/0212311 A1 | 8/2010 | McQuary et al. |
| 2010/0218496 A1 | 9/2010 | Miles |
| 2011/0056196 A1 | 3/2011 | Berchowitz et al. |
| 2011/0150373 A1 | 6/2011 | Howes |
| 2011/0174271 A1 | 7/2011 | Wood |
| 2011/0219763 A1 | 9/2011 | McBride et al. |
| 2012/0125288 A1 | 5/2012 | Simpson et al. |
| 2012/0125291 A1 | 5/2012 | Simpson et al. |
| 2012/0126543 A1 | 5/2012 | Simpson et al. |
| 2012/0204836 A1 | 8/2012 | Roelle et al. |
| 2012/0227699 A1 | 9/2012 | Perry et al. |
| 2020/0124500 A1 | 4/2020 | Haynes et al. |
| 2020/0195093 A1 | 6/2020 | Svrcek et al. |

FOREIGN PATENT DOCUMENTS

| | | |
|---|---|---|
| DE | 102005006340 A1 | 4/2007 |
| EP | 2357348 A1 | 8/2011 |
| GB | 1125524 A | 8/1968 |
| GB | 1536118 A | 12/1978 |
| GB | 2555752 A | 5/2018 |
| JP | 2003-343202 A | 12/2003 |
| JP | 2005-524016 A | 8/2005 |
| JP | 2006-220289 A | 8/2006 |
| JP | 2009-185926 A | 8/2009 |
| JP | 2009-541635 A | 11/2009 |
| WO | WO 99/01651 A1 | 1/1999 |
| WO | WO 02/33807 A1 | 4/2002 |
| WO | WO 02/44593 A1 | 6/2002 |
| WO | WO 2003/106827 A1 | 12/2003 |
| WO | WO 2007/059565 A1 | 5/2007 |
| WO | WO 2009/045521 A1 | 4/2009 |

OTHER PUBLICATIONS

Belforte et al., "Study and Realization of High Efficiency Sealless Cylinder," International Fluid Power Exposition, Mar. 24-26, 1992, 10 pages, National Fluid Power Association.

(56) References Cited

OTHER PUBLICATIONS

Blarigan; "Adanced Internal Combustion Engine Research," DOE Hydrogen Program Review NREL-CP-570-28890 (2000); pp. 1-19.
Kim, "Specific Power Estimations for Free-Piston Stirling Engines," American Institute of Aeronautics Astronautics, (Jun. 2006); pp. 1-8.

* cited by examiner

SYSTEMS AND METHODS FOR FLEXURE-BASED BEARING MOUNTING

CROSS-REFERENCE TO RELATED APPLICATIONS

This application claims the benefit of U.S. Provisional Patent Application No. 63/227,780 filed Jul. 30, 2021, the disclosure of which is hereby incorporated by reference herein in its entirety.

The present disclosure is directed to bearing structures for forming gas bearings, and more particularly, to bearing structures for controlling or otherwise limiting the trajectory of a translator of a linear generator.

SUMMARY

In some embodiments, the present disclosure is directed to bearing structures. In some embodiments, the present disclosure is directed to systems for constraining translator displacement. In some embodiments, the present disclosure is directed to methods for constraining translator displacement.

In some embodiments, the present disclosure is directed to a bearing assembly for a linear electromagnetic machine (LEM). The bearing structure includes a sleeve having a surface configured to provide a bearing between the surface and a translator, a front plate coupled to the sleeve, a support block, and a plurality of flexures coupled to the support block. Each flexure is coupled between the support block and one of the front plate or a stator. In some embodiments, the bearing structure includes at least one hub affixing the sleeve to the front plate. In some embodiments, the surface is configured to provide a gas bearing between the surface and the translator during operation. In some embodiments, the sleeve is an inner sleeve, and the bearing structure includes an outer sleeve that forms one or more gas passages for providing gas to a gas bearing adjacent to the surface.

In some embodiments, the plurality of flexures includes (i) first flexures arranged at a first azimuthal position and a second azimuthal position of the bearing assembly and affixed to the support block and to the front plate, and (ii) second flexures arranged at a third azimuthal position and a fourth azimuthal position of the bearing structure and affixed to the support block and the stator. For example, in some embodiments, the bearing structure includes two first flexures and two second flexures.

In some embodiments, a load path extends from the stator to the support block via a first set of flexures of the plurality of flexures, from the support block to the front plate via a second set of flexures of the plurality of flexures, and from the front plate to the sleeve.

In some embodiments, the present disclosure is directed to a stator assembly of a linear generator. The stator assembly includes a stator configured to electromagnetically interact with a translator, at least one bearing assembly (e.g., each being a bearing structure) coupled to the stator, each bearing assembly including a plurality of flexures that couple a sleeve to the stator. Each flexure is configured to allow pitch or yaw of the sleeve, and the sleeve (e.g., a surface thereof) interfaces with the translator. In some embodiments, the surface provides a gas bearing with the translator during operation. In some embodiments, the bearing assembly includes an outer sleeve that forms one or more gas passages for providing gas to a gas bearing adjacent to a surface of the sleeve.

In some embodiments, the present disclosure is directed to a linear electromagnetic machine (LEM) that includes a stator comprising a plurality of phases, a translator that moves along the stator and electromagnetically interacts with the plurality of phases, and at least one bearing assembly coupled to the stator. Each bearing assembly includes a plurality of flexures that couple a sleeve, interfacing with the translator, to the stator. Each flexure allows pitch or yaw. In some embodiments, the at least one bearing assembly includes a first bearing assembly and a second bearing assembly, where the first bearing assembly is arranged at a first axial end of the stator, and the second bearing assembly is arranged at a second axial end of the stator.

In some embodiments, the present disclosure is directed to a method for operating a linear generator. The method includes providing stiffness against pitch and yaw using a plurality of flexures that couple a stator assembly to a sleeve having a surface configured to provide a bearing between the surface and a translator, providing gas to a bearing surface of the sleeve to form a gas bearing between the surface and a surface of a translator, and maintaining a motor air gap using the gas bearing. In some embodiments, the method includes providing current to phases of the stator assembly along which the translator is configured to move. In some embodiments, the method includes monitoring a pressure of the gas during operation. In some embodiments, the method includes causing the translator to move axially along the gas bearing.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

The present disclosure is applicable towards bearing mounting structures for linear generators. Linear generators may include stators, translators, cylinders, manifolds, pistons, sealing ring assemblies, bearings, sensors, any other suitable components, or any suitable combination thereof. For example, a linear generator may include one or more linear electromagnetic machines (LEMs) formed by respective translator/stator pairs, which are aligned using the bearing structures of the present disclosure. For example, in some embodiments, the bearing mounting structures are configured to:
  (i) be axially stiff enough to avoid resonance from high axial excitation;
  (ii) be radially stiff enough to securely align a translator to a cylinder and a stator (e.g., overcoming magnetic forces);
  (iii) provide enough compliance (e.g., in yaw and pitch) to allow a relatively low-stiffness air film (e.g., a gas bearing) to align the bearing housing to the translator tube axis without consuming too much of the bearing housing's load-carrying capacity;
  (iv) permit the bearing sleeve (e.g., of a bearing housing) to thermally expand and contract without distorting the bearing bore (e.g., an outer bearing surface) in a way that could lead to reduced air film capacity (e.g., gas bearing capacity) or binding of the translator tube;
  (v) permit the bearing sleeve (e.g., of the bearing housing) to be removed and replaced in the field (e.g., should a failure occur or a replacement sleeve design be installed);
  (vi) keep the overall structure lightweight enough to not have axial or rotational excitation modes that can be significantly excited by the shaking of the linear generator (e.g., during operation);
  or a combination thereof (e.g., any or all of (i)-(vi)).

Figure 1:
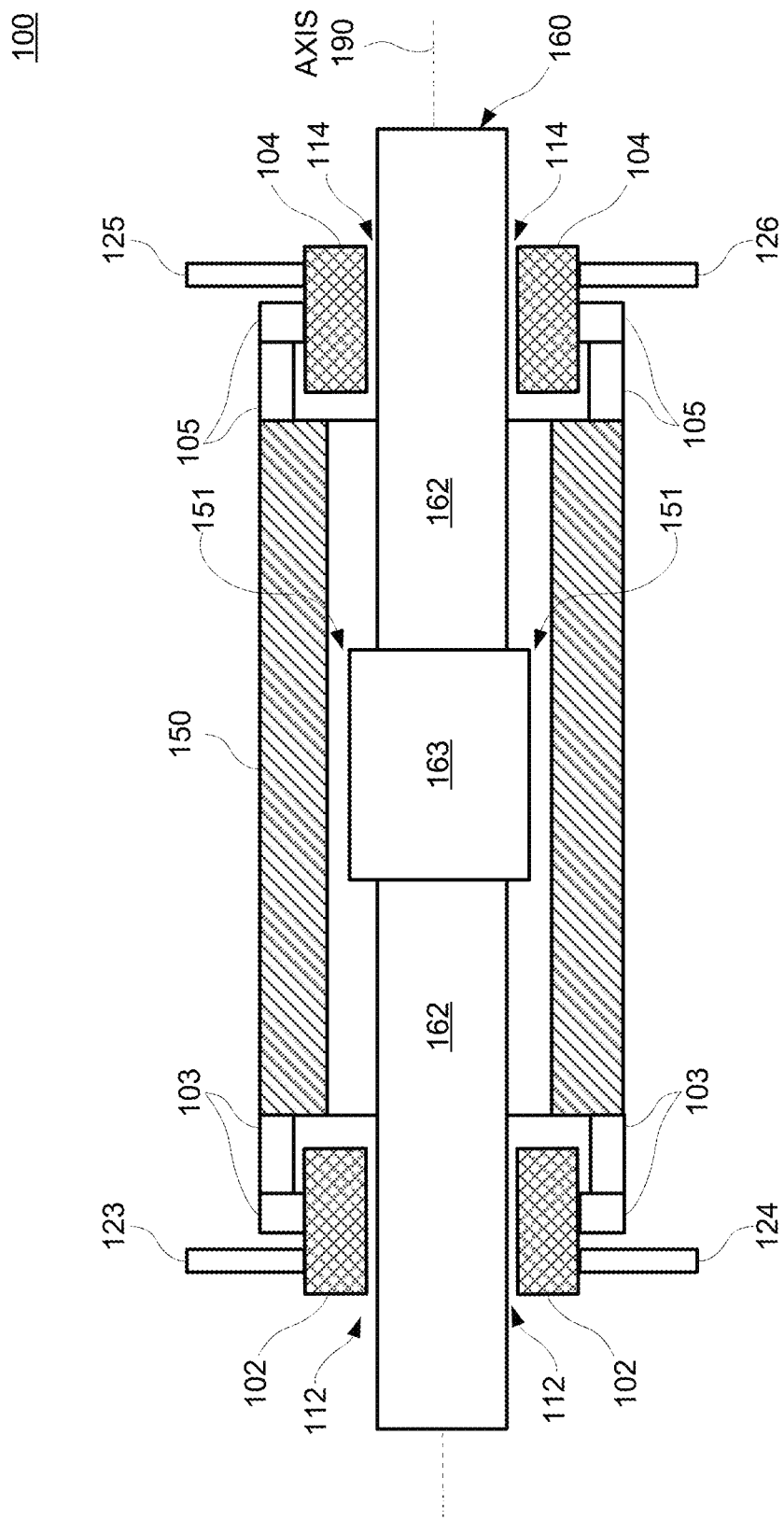
FIG. 1 shows a cross-sectional view of an illustrative linear electromagnetic machine, in accordance with some embodiments of the present disclosure.

FIG. 1 shows a cross-sectional view of illustrative LEM 100, in accordance with some embodiments of the present disclosure. LEM 100 includes translator 160, stator 150, bearing housings 102 and 104, mounting assemblies 103 and 105 (e.g., flexures including hinges, plates, hubs, and/or any other suitable components), features 123-126 (e.g., tubes, ports, fittings, or a combination thereof to receive bearing gas from a gas supply), and bearing interfaces 112 and 114. Translator 160 includes tube 162 and section 163 configured to interact electromagnetically with stator 150. For example, section 163 (also referred to as an "electromagnet section" or "magnet section") may include a magnet section having permanent magnets, electromagnets, an induction section, or a combination thereof. Although referred to as a tube, tube 162 may have any suitable cross-sectional shape, and accordingly bearing interfaces 112 and 114 may have a corresponding shape. For example, in some embodiments, tube 162 may have a rectangular cross section, and accordingly bearing interfaces 112 and 114 may be flat rather than annular. In a further example, in some embodiments, tube 162 may have at least one circular cross section for a first longitudinal distance (i.e., axial distance) and at least one rectangular cross section for a second longitudinal distance, where the first and second longitudinal distances may be equal or different.

To illustrate, stator 150 is configured to electromagnetically interact with translator 160. At least one bearing assembly is coupled to stator 150 (e.g., LEM includes two bearing assemblies), with each bearing assembly having a plurality of flexures (e.g., of mounting assemblies 103 and 105) that couple a sleeve (e.g., of bearing housings 102 and 104) to stator 150. For example, each flexure is configured to allow pitch or yaw of the sleeve, and the sleeve interfaces with translator 160.

Stator 150 and section 163 interact electromagnetically to cause motion of translator 160, affect motion of translator 160, convert kinetic energy of translator 160 (e.g., based on the mass and velocity of translator 160) to electrical energy (e.g., in windings of phases of stator 150 and, if desired, power electronics coupled thereto), convert electrical energy (e.g., in windings of phases of stator 150 and, if desired, power electronics coupled thereto) into kinetic energy of translator 160, or a combination thereof. Motor gap 151 (as referred to as "motor air gap") between stator 150 (e.g., laminated ferrous teeth thereof) and section 163 (e.g., permanent magnets thereof) affects reluctance of the electromagnet magnetic interaction between stator 150 and translator 160. For example, the smaller the motor gap 151 is, the larger the motor force constant (e.g., larger magnetic flux) that can be achieved between stator 150 and translator 160. However, if motor gap 151 nears zero (e.g., at one or more locations), translator 160 may contact stator 150 causing friction, impact, deformation, electrical shorts, reduced performance, failure, or any combination thereof. Accordingly, bearings are used to maintain the lateral alignment of stator 150 and translator 160 (e.g., to maintain motor gap 151 in an operable range).

In some embodiments, as illustrated, bearing housings 102 and 104 are affixed to stator 150 by mounting assemblies 103 and 105. For example, rigidly affixing bearing housings 102 and 104 to stator 150 may help in counteracting lateral (e.g., radial) loads on translator 160. In some embodiments, one or both of bearing housings 102 and 104 may be coupled to stator 150 by mounting assemblies 103 and 105, having flexures with prescribed stiffness or compliance in one or more directions. In some embodiments, mounting assemblies 103 and 105 may be affixed to stator 150 or a stator frame thereof. In some embodiments, one or both bearing housings 102 and 104 need not be affixed to stator 150 and may be affixed to any other suitable stationary component (e.g., an external frame). In some embodiments, only one bearing housing (e.g., bearing housing 102 or bearing housing 104) is needed. To illustrate, the cantilever mounting of the bearing housing to support the translator may provide minimal constraints on the translator, which provides more tolerance to misalignments.

In some embodiments, one or both bearing interfaces 112 and 114 are configured as contact bearings. In some embodiments, one or both bearing interfaces 112 and 114 are configured as non-contact bearings. In some embodiments, one or both bearing interfaces 112 and 114 are configured as gas bearings (e.g., a type of non-contact bearing). In some such embodiments, one or both bearing housings 102 and 104 are configured to receive bearing gas from features 123-126, which may include respective ports for receiving respective bearing gas supplies. For example, referencing a tubular geometry, each of bearing housings 102 and 104 may include a bearing surface arranged at a radially inward surface, configured to interface with respective annular gas bearings in bearing interfaces 112 and 114. Tube 162 may include a cylindrical bearing surface configured to interface with annular bearing interfaces 112 and 114. During operation, bearing interfaces 112 and 114 allow translator 160 to move along axis 190 with low or near-zero friction, and prevent substantial lateral (e.g., radial) motion off from axis 190. For example, bearing interfaces 112 and 114 may be configured to maintain motor air gap 151 between stator 150 (e.g., iron stator teeth and copper windings thereof) and section 163 during operation. It will be understood that bearing interfaces 112 and 114, and motor air gap 151 may respectively have any suitable thickness. For example, in general the thicknesses are preferred to be as thin as possible while ensuring reliable operation. In some embodiments, bearing interfaces 112 and 114 are configured to be 20-150 microns thick and motor air gap 151 is configured to be 20-40 mm thick.

In an illustrative example, in which bearing interfaces 112 and 114 are configured as gas bearings, bearing gas is configured to exit bearing housings 102 and 104 (e.g., to form respective gas bearings in bearing interfaces 112 and 114) in a substantially radially inward direction (i.e., streamlines directed towards axis 190). Bearing gas may flow through porous sections of bearing housings 102 and 104, ducts and orifices within bearing housings 102 and 104, or a combination thereof, to reach respective bearing interfaces 112 and 114.

In some embodiments, bearing housings 102 and 104 may include a coating, a consumable layer, a dry film lubricant, an abradable coating, or a combination thereof, at corresponding bearing surfaces to accommodate, for example, contact with translator 160 while limiting or avoiding damage to the translator, bearing housing, or both. In some embodiments, translator 160 may include a coating, a consumable layer, a dry film lubricant, an abradable coating, or a combination thereof, to accommodate, for example, contact with bearing housings 102 and 104 while limiting or avoiding damage to the translator, bearing housing, or both. In some embodiments, a bearing housing extends fully and continuously (e.g., 360° azimuthally) around a translator. In some embodiments, a bearing housing includes one or more bearing segments that extend for an azimuthal range around a translator that is less than 360°. For example, a bearing housing may include four bearing segments, each extending about 90° around the translator, with azimuthal gaps in between the bearing segments. A bearing housing may include any suitable number of bearing segments having any suitable number of gaps, and arranged in any suitable configuration, around a translator.

Figure 15:
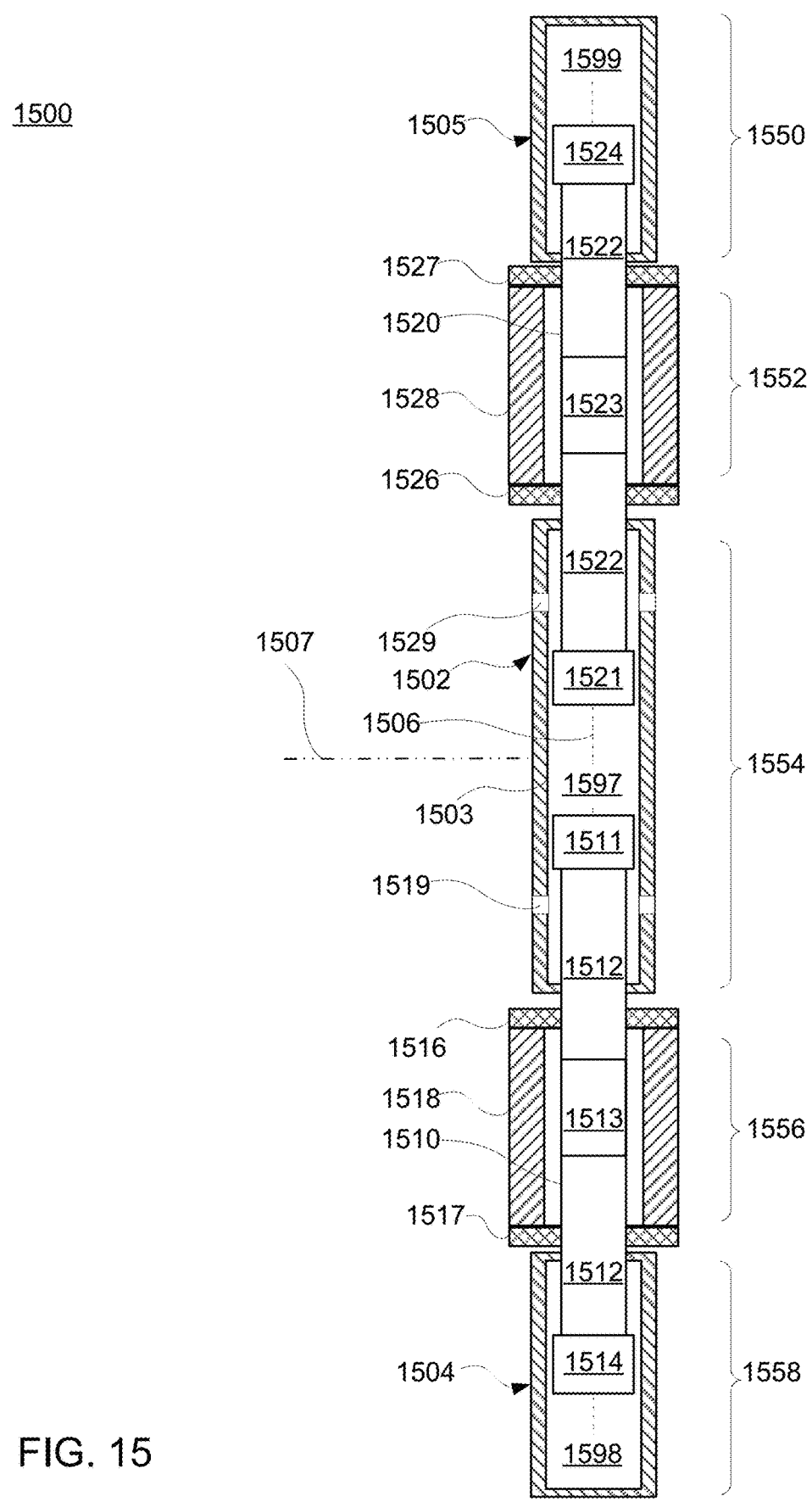
FIG. 15 shows a cross-sectional side view of an illustrative generator assembly, in accordance with some embodiments of the present disclosure.

In some embodiments, translator 160 may include one or more pistons or end caps (not shown in FIG. 1) affixed to axial ends of tube 162. For example, tube 162 may act as a rigid body coupling the pistons and other components to form a rigid translator. In a further example, LEM 100 may be included as part of a linear generator (e.g., as illustrated in FIG. 15), in which one piston is configured to contact a reaction section and the other piston is configured to contact a gas spring. Although section 163 is illustrated in FIG. 1 as being axially shorter than stator 150, section 163 may be axially shorter, longer, or the same length as stator 150, in accordance with some embodiments of the present disclosure. In some embodiments, whether section 163 is longer, shorter, or the same length as stator 150, section 163 or portions thereof may be capable of being positioned axially outside of stator 150 (e.g., axially beyond ends of stator 150).

In an illustrative example, the bearing structures (e.g., mounting assemblies 103 and 105, and bearing housings 102 and 104 thereof) must be axially stiff enough such that large axial vibrations do not excite the bearing structure's axial mode, which may lead to unstable air films and contact between the translator and the opposing bearing surface. In some embodiments, an axially stiff bearing structure allows an encoder to be mounted directly to the bearing structure. For example, in some embodiments, the bearing structure provides a preferred location to best control the radial distance between a translator encoder tape and an encoder read head (e.g., an optical or magnetic linear encoder read head coupled to control circuitry).

In a further illustrative example, the bearing structures must be radially stiff in order to hold the translator securely in alignment to the stator (e.g., a primary function of the bearing structure), power cylinder, air spring cylinder, or a combination thereof. To illustrate, magnets mounted around the outer diameter of the translator provide a radial force on the translator toward the stator, adding to forces caused by the mass of the translator, forces due to vibration, and the cyclic radial component of force due to power cylinder reaction and air spring pressure, or a combination thereof.

In a further illustrative example, manufacturing tolerances within LEM components can result in conditions wherein two bearings need to operate in conditions where they are not perfectly perpendicular to their mounting faces or each other. To illustrate, this circumstance may occur under static conditions due to part and assembly tolerances, and under dynamic conditions (e.g., during operation) due to translator straightness (e.g., or deviations thereof). In some embodiments, the bearing structures include hinges that allow the bearing structures to adjust in yaw and pitch and accommodate tolerances, yet remain stiff in radial and axial positioning to maintain proper system alignment.

In some embodiments, the bearing structures of the present disclosure are configured to operate at temperatures between −40° C. and 120° C. (e.g., during operation). To illustrate, this relatively large range of operating temperature means the mounting components of the bearing structure must allow for thermal expansion without constraining the inner sleeve of the bearing housing in a way that the inner diameter size or shape is significantly affected (e.g., the bearing surface is not significantly affected).

In addition to the hinges of the present disclosure, other approaches may be combined or included to form a bearing structure for a gas bearing. In some embodiments, for example, alternative bearing structures may include a flexible disc to allow for yaw and pitch through flex on the disc, a pad with a ball joint to allow the pad to pivot into proper alignment position or if radial load is light, O-rings used as a flexible mounting system, any other suitable component, or any combination thereof. To illustrate, a flexible disc design may create a two-point constraint on the bearing during thermal expansion, which may cause the bearing to ovalize significantly as it warms up and may lead to contact between the translator and bearing surface as the air film (e.g., the gas bearing) becomes unstable. To illustrate further, some flexible disc designs exhibit relatively low axial stiffness, which may cause the bearing structure to resonate axially and may lead to contact between the translator and the outer bearing surface as well as cause control issues (e.g., if an encoder is mounted directly to the bearing). In a further example, ball joints and O-rings may structurally degrade, bind up, or creep in a high-load, extreme temperature-dynamic environment and might not provide a robust and service-free solution, in addition to having a greater likelihood of imposing a radial thermal constraint on the bearing sleeve as it heats up.

FIGS. 2-11 illustrate an illustrative assembly configured to provide a bearing structure, in accordance with some embodiments of the present disclosure. As illustrated, bearing structure 200 includes front plate 202, support block 204, flexures 211-214 (e.g., each including a hinge and mounting features), hubs 221-224, sleeve 230 (e.g., an inner sleeve, having surface 235 and holes 236), and sleeve 231 (e.g., an outer sleeve). It will be understood that a flexure as referred to herein refers to a component having a hinge and mounting features such as flanges.

Figure 2:
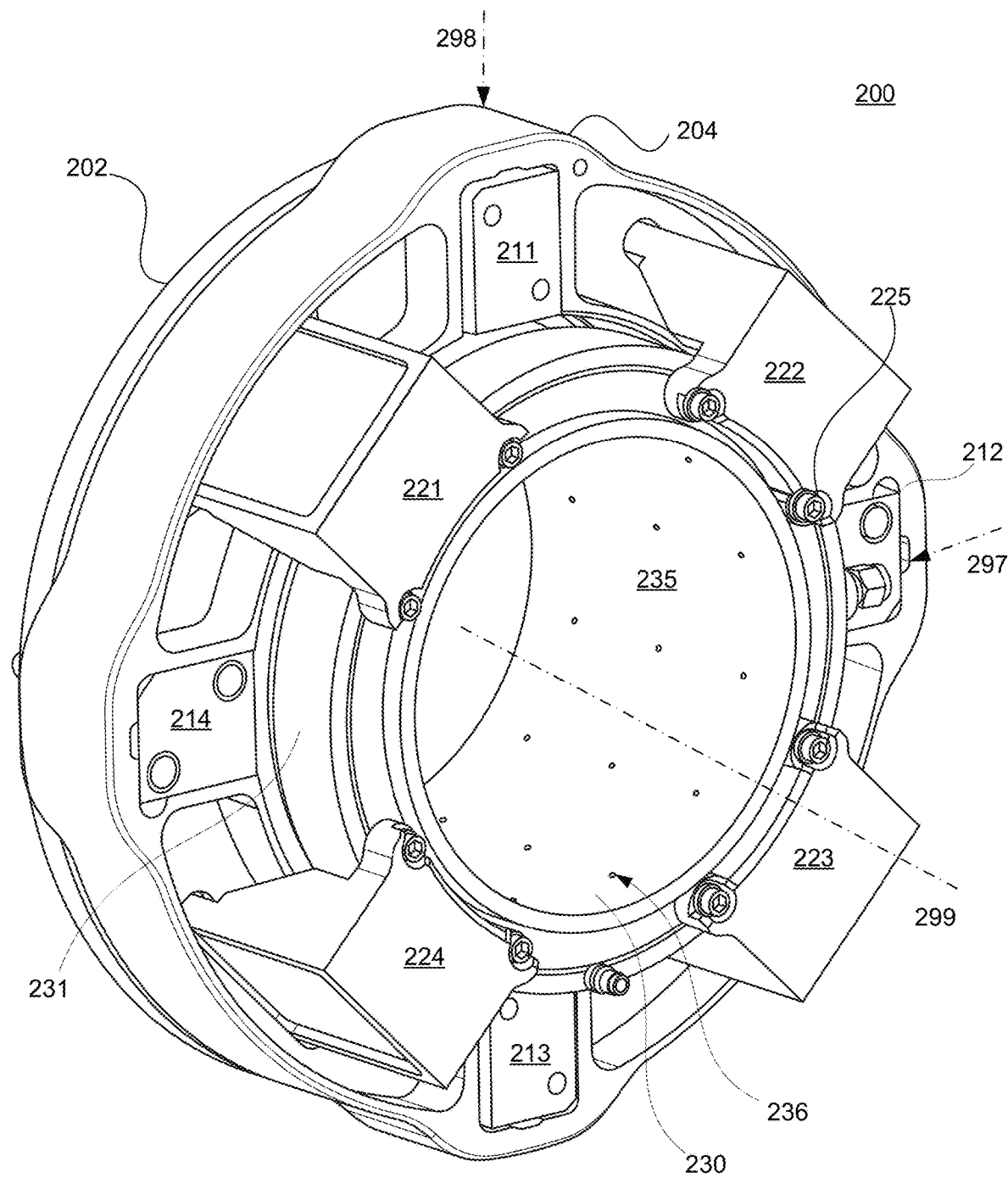
FIG. 2 shows a perspective view of an illustrative bearing structure, in accordance with some embodiments of the present disclosure.

FIG. 2 shows a perspective view of illustrative bearing structure 200, in accordance with some embodiments of the present disclosure. Bearing structure 200 is shown separated from a LEM structure. In some embodiments, bearing structure 200 is connected to the LEM structure through the rear of either of the yaw flexures (e.g., flexures 211 and 213) or the pitch flexures (e.g., flexures 212 and 214), with the other set of flexures connected to front plate 202. Axis 299 corresponds to the axial direction in polar coordinates, with the radial direction extending outward normal from axis 299, and the azimuthal direction extending around axis 299 (i.e., normal to the axial and radial directions).

Figure 3:
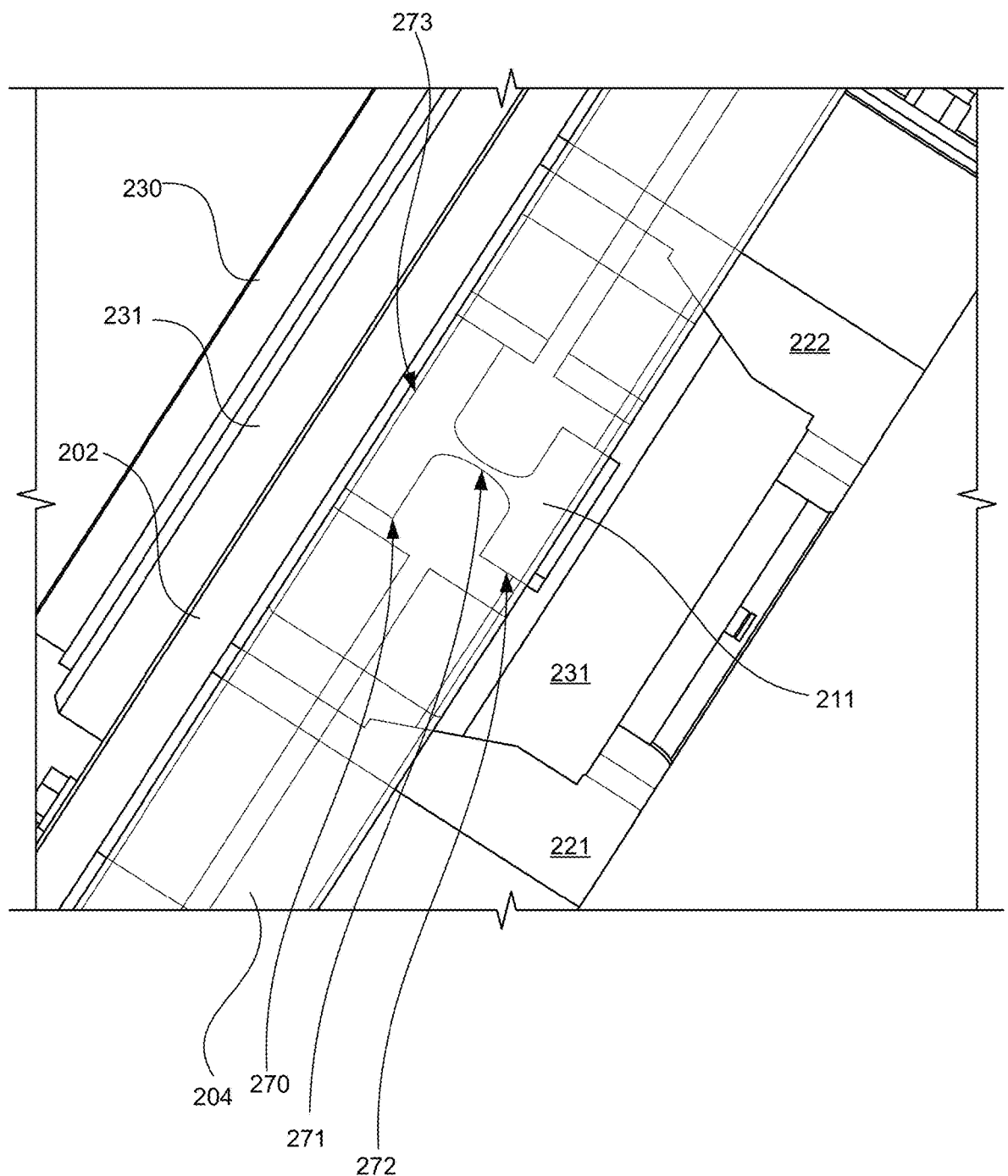
FIG. 3 shows a portion of the bearing structure of FIG. 2 illustrating a yaw flexure (e.g., one of two) that mounts rigidly to (i) the front side of the support block (e.g., illustrated as transparent for clarity) and, (ii) at another end bolts to the stator structure, in accordance with some embodiments of the present disclosure.

FIG. 3 shows a portion of bearing structure 200 of FIG. 2 illustrating a yaw hinge (e.g., of either flexure 211 or 213) that mounts rigidly to (i) the front side of support block 204 (e.g., illustrated as transparent for clarity) and, (ii) at another end bolts to a stator structure (not illustrated in FIG. 3), in accordance with some embodiments of the present disclosure. As illustrated, for each yaw flexure (e.g., flexures 211 and 213), one axial end mounts rigidly to the front side of support block 204 (e.g., axially outboard relative to the stator), while the other axial end bolts to the stator structure (e.g., axially inboard relative to the stator). As illustrated, flexure 211 includes mounting features 270 and 272 (e.g., flanges with holes for affixing), and hinge 271 configured to exhibit a predetermined stiffness against displacement accordingly to various degrees freedom, with a reduced stiffness corresponding to at least one degree of freedom. The view of FIG. 3 is taken along direction 298 shown in FIG. 2. Gap 273 exists between flexure 211 and front plate 202, as flexures 211 and 213 (i.e. comprising the yaw hinge) are not affixed to front plate 202 but rather to the stator assembly (e.g., and support block 204).

Figure 4:
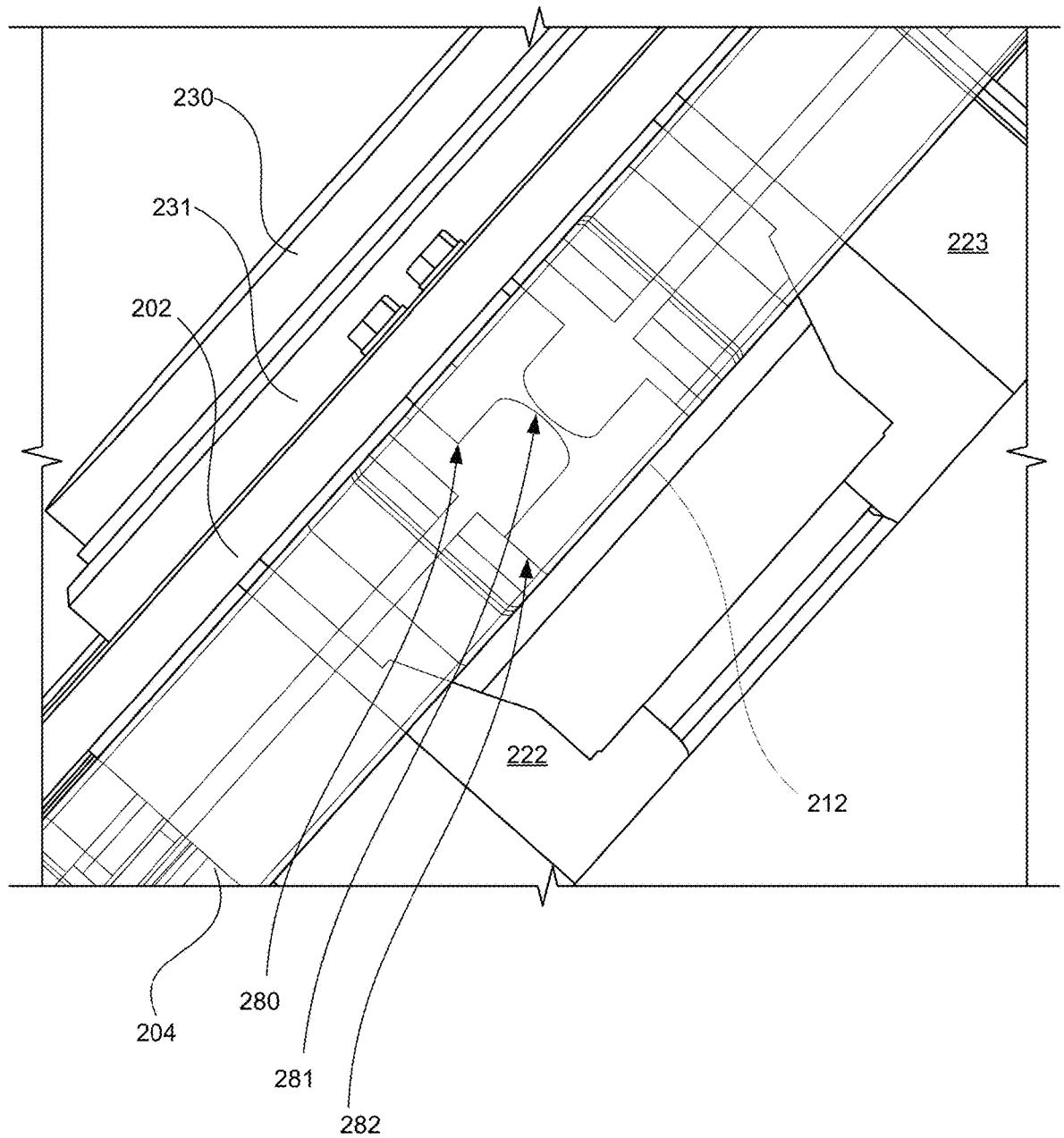
FIG. 4 shows a portion of the bearing structure of FIG. 2 illustrating a pitch flexure (e.g., one of two) that mounts rigidly to the rear of the support block, and then bolts rigidly to the front plate, in accordance with some embodiments of the present disclosure.

FIG. 4 shows a portion of the bearing structure of FIG. 2 illustrating a pitch hinge (e.g., of either flexure 212 or 214) that mounts rigidly to the rear of support block 204, and then bolts rigidly to front plate 202, in accordance with some embodiments of the present disclosure. To illustrate, flexures 212 and 214 include respective pitch hinges that are mounted rigidly to the rear of support block 204, and also rigidly affixed (e.g., by bolts) to front plate 202. To illustrate, hubs 221-224 (e.g., L-shaped hub sections) extend (e.g., axially at least) through support block 204 without touching support block 204, and mount rigidly to front plate 202 (e.g., through features thereof to accommodate the hub sections) and also mount to sleeve 230 (e.g., by bolts, as illustrated). Only hub 222 is shown in the view of FIG. 4. As illustrated, flexure 212 includes mounting features 280 and 282 (e.g., flanges with holes for affixing), and hinge 281 configured to exhibit a predetermined stiffness against displacement accordingly to various degrees freedom, with a reduced stiffness corresponding to at least one degree of freedom. The view of FIG. 4 is taken along direction 297 shown in FIG. 2. Flexures 212 and 214 are affixed to front plate 202 (e.g., and support block 204) rather than to the stator assembly, forming pitch hinges. Note that each of flexures 211-214 may include a hinge such as hinge 271 or 281, which may be the same. Similarly, each of flexures 211-214 may include mounting features such as mounting features 270 and 272, or 280 and 282, which may be the same.

Figure 5:
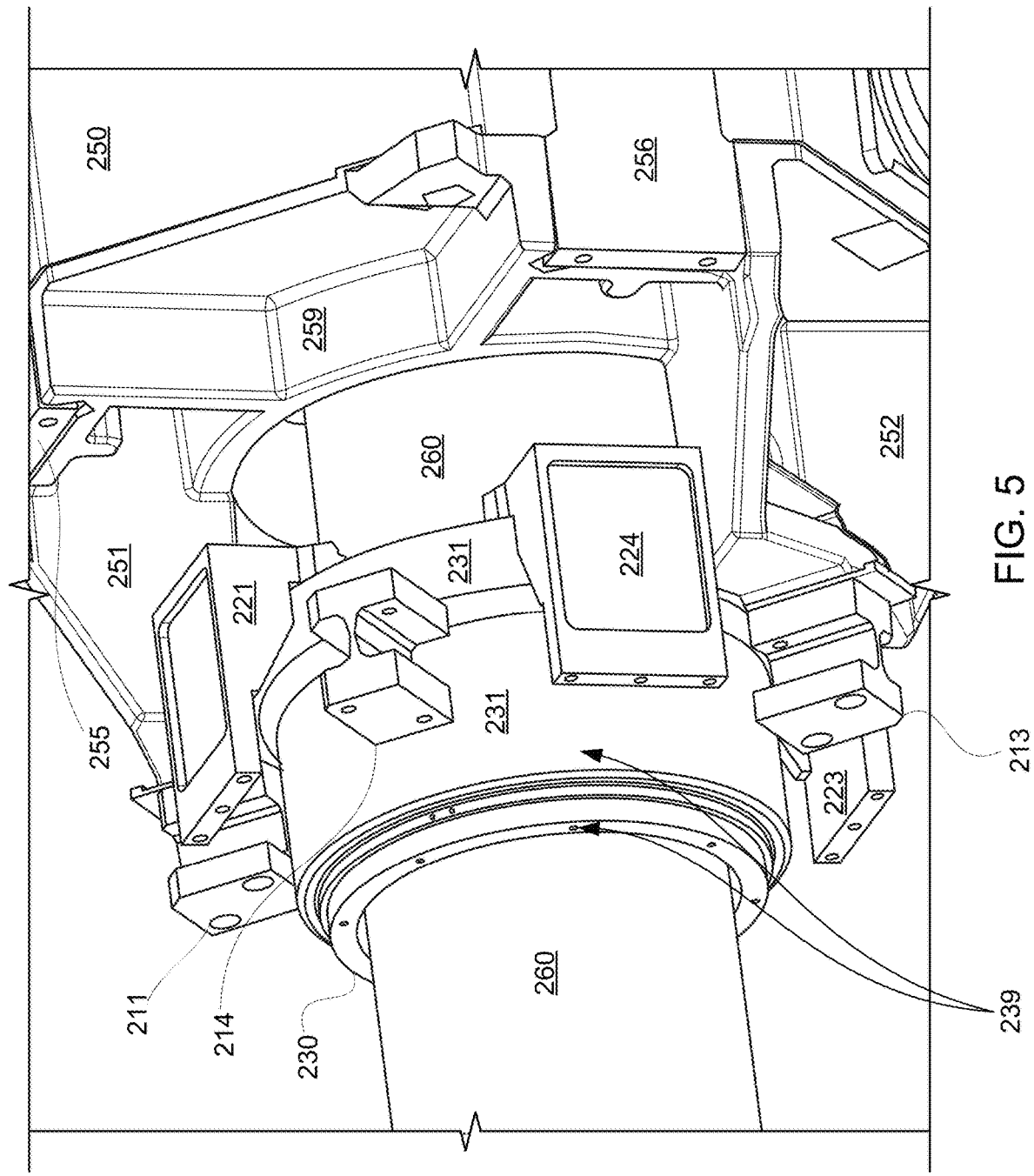
FIG. 5 shows a portion of the bearing structure of FIG. 2 arranged as part of a linear generator, in accordance with some embodiments of the present disclosure.

FIG. 5 shows a portion of bearing structure 200 of FIGS. 2-4 arranged as part of a linear generator (e.g., with some components hidden for purposes of illustration), in accordance with some embodiments of the present disclosure. The stator assembly includes stator 250, stator mounts (e.g., stator mounts 251 and 252, which may be features of a single component 259 or separate components), and stator couplings (e.g., stator couplings 255 and 256).

As illustrated in aspects of FIGS. 2-5, four individual hubs 221-224 (e.g., L-shaped hub sections also referred to herein as "hubs") mount to one axial end of sleeve 230 using eight fasteners as illustrated (e.g., fasteners 225). The "L" shape allows for compliance as bearing structure 200 expands diametrically but provides a rigid connection to axial and radial loads (e.g., for axial and radial loading). Since hubs 221-224 are four individual pieces, they provide a minimal or otherwise reduced amount of constraint when compared to a single-piece part. In some embodiments, hubs 221-224 may behave similarly to "expansion" hinges (e.g., axial expansion, lateral or radial expansion), while still providing sufficient radial stiffness. Hubs 221-224 extend through support block 204 and mount to front plate 202, providing them more length (e.g., axial length) to enable this expansion compliance.

Two pairs of flexures 211-214 are mounted around sleeve 230 (e.g., azimuthally spaced) to provide yaw and pitch compliance and allow bearing structures to accommodate fixed manufacturing and assembly tolerances without overconstraining the assembly. As illustrated in FIGS. 2-5, the top and bottom flexures (e.g., flexures 211 and 213) provide yaw compliance between the bearing sleeve and the stator, while the left and right flexures (e.g., flexures 212 and 214) provide pitch compliance. Flexures 211-214 also allow the bearing assembly (e.g., bearing structure 200) to accommodate changing straightness (e.g., of an imperfect translator 260, which may arise from machining or thermal variations).

In some embodiments, each of flexures 211-214 includes a hinge that provides flex (e.g., reduced stiffness in at least one degree of freedom) without significant wear or maintenance. The shape and assembly position of each flexure is such that the part provides significant radial and axial stiffness while providing a low bending stiffness. In an illustrative example, a bearing structure may include four flexures that include two pitch hinges (e.g., arranged at the right and left), and two yaw hinges (e.g., arranged at the top and bottom). To illustrate, in some embodiments, the pitch hinges couple the front plate and the support block, while the yaw hinges couple the support block and the stator assembly. In a further example, a bearing structure may include N flexures (e.g., where N is an integer two or greater), arranged azimuthally about a sleeve, and configured to provide compliance in a degree of freedom (e.g., which may be, but need not be, pitch and yaw). For example, flexures can be arranged clocked 45° from that illustrated, or a non-multiple of four may be included (e.g., six flexures).

Support block 204 and front plate 202 provide radial stiffness to the assembly, while still permitting the hinge elements (i.e., of flexures 211-214) to pitch, yaw, expand, or a combination thereof. The yaw flexures (e.g., flexures 211 and 213 located at top and bottom in FIG. 2) may mount directly to the stator structure (e.g., to stator mounts 251 and 252 of FIG. 5), as well as the support block 204. As shown in FIG. 5, a linear generator may include translator 260 and stator 250, which form a LEM, and bearing structure 200 may be coupled to stator 250 (e.g., using a stator mount thereof such as stator mounts 251 and 252) to maintain alignment of translator 260, provide stiffness against off-axis displacement, allow some displacement in some degrees of freedom, resist forces, maintain a motor air gap, prevent contact of translator 260 with other components, or a combination thereof. In some embodiments, component 259 is coupled to stator 250 by stator couplings 255 and 256, and component 259 includes stator mounts 251 and 252. For example, component 259 may be a single assembly or component that includes stator mounts 251 and 252 and is bolted or otherwise affixed to stator 250 by one or more stator couplings (e.g., stator couplings 255 and 256). Bearing housing 239 includes sleeves 230 and 231, which may seal together using O-rings, gaskets, sealant, any other suitable seal, or any combination thereof. It will be understood that in some embodiments, a bearing structure may be included at each axial end of stator 250 (e.g., two bearing structures coupled to the stator), to constrain a trajectory of translator 260 (e.g., as illustrated in FIG. 1).

Figure 7:
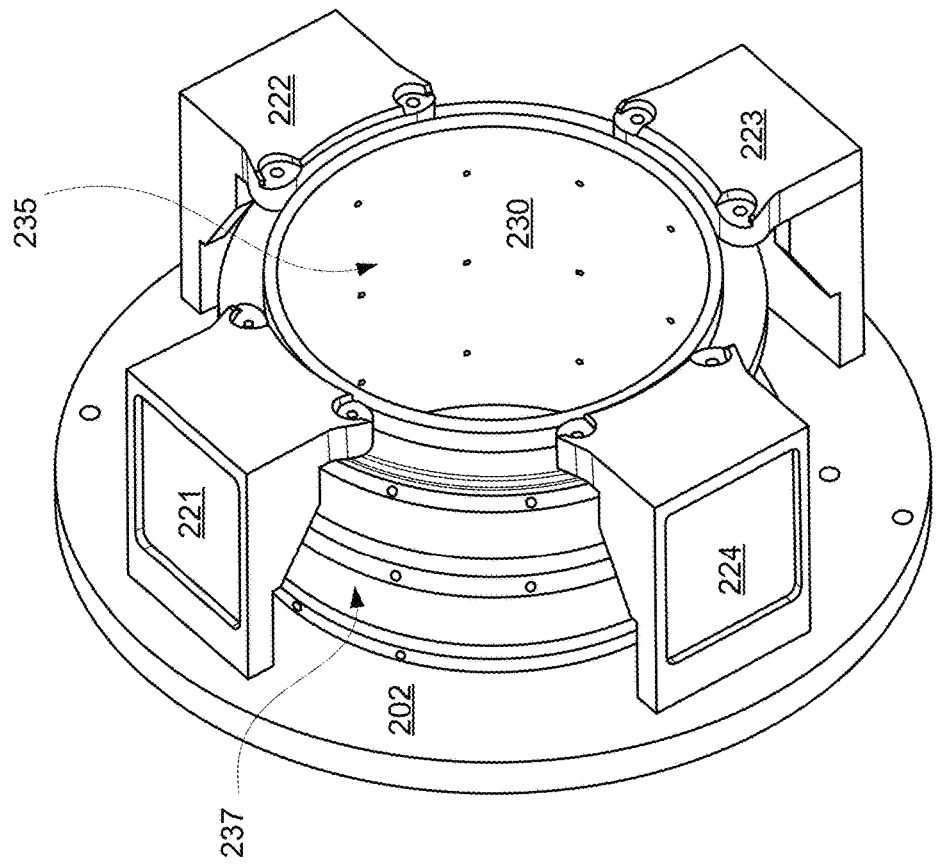
FIG. 7 shows another perspective view of some components of the bearing structure of FIG. 2, in accordance with some embodiments of the present disclosure.
Figure 6:
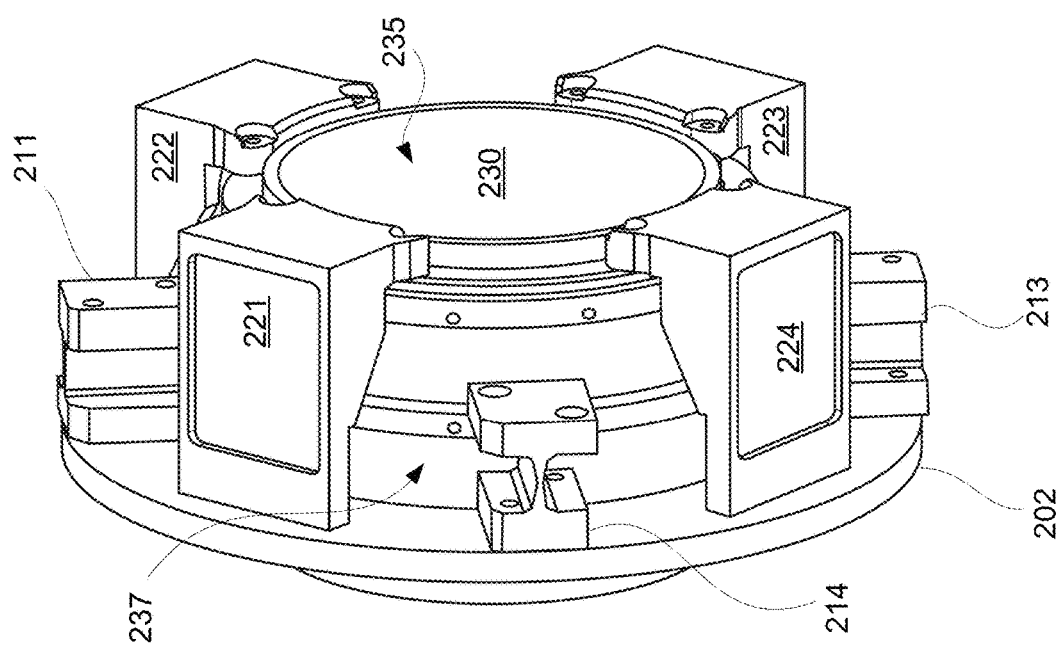
FIG. 6 shows a perspective view of some components of the bearing structure of FIG. 2, in accordance with some embodiments of the present disclosure.

FIG. 6 shows a perspective view of some components of bearing structure 200, in accordance with some embodiments of the present disclosure. FIG. 7 shows another perspective view of some components of bearing structure 200, in accordance with some embodiments of the present disclosure. The partial assembly of FIG. 6 shows hubs 221-224, sleeve 230, and flexures 211, 213, and 214 (e.g., flexure 212 is not visible in FIG. 6). Sleeve 230 mounts to hubs 221-224, which may be capable of flexing (e.g., are cantilevered) to allow thermal expansion but can be considered as rigid bodies in comparison to the hinges. Hubs 221-224 (e.g., L-shaped expansion hubs), in turn, bolt onto or are otherwise affixed to front plate 202. To illustrate, this assembly (except the hinges) can be thought of as a rigid body that articulates in pitch and yaw via the hinges. In some embodiments, sleeve 231 (e.g., an outer sleeve, not shown in FIG. 6) forms one or more gas passages 237 for providing gas to a gas bearing adjacent to surface 235 of sleeve 230.

The pitch hinge(s) (e.g., flexures 212 and 214) mounts directly to front plate 202 at its front (e.g., axially farther from stator 250) and to support block 204 (not shown in FIGS. 6-7) at its rear (e.g., proximal to stator 250). Accordingly, pitch of front plate 202, and hence sleeve 230, occurs relative to support block 204 (not shown in FIGS. 6-7). To illustrate, front plate 202 can pitch relative to support block 204. However, if support block 204 rotates in yaw, front plate 202, and hence sleeve 230, may move with it. As shown in FIG. 6, flexures 211-214 are I-shaped such that they flex in bending to allow articulation of the bearing assembly in pitch or yaw. Notably, the pitch flexures (e.g., flexures 212 and 214) are stiff enough to hold the bearing assembly against gravity without appreciable deflection, as in some embodiments, the pitch flexures (e.g., flexures 212 and 214 that are diametrically opposed) support the entire weight of the bearing assembly.

Figure 8:
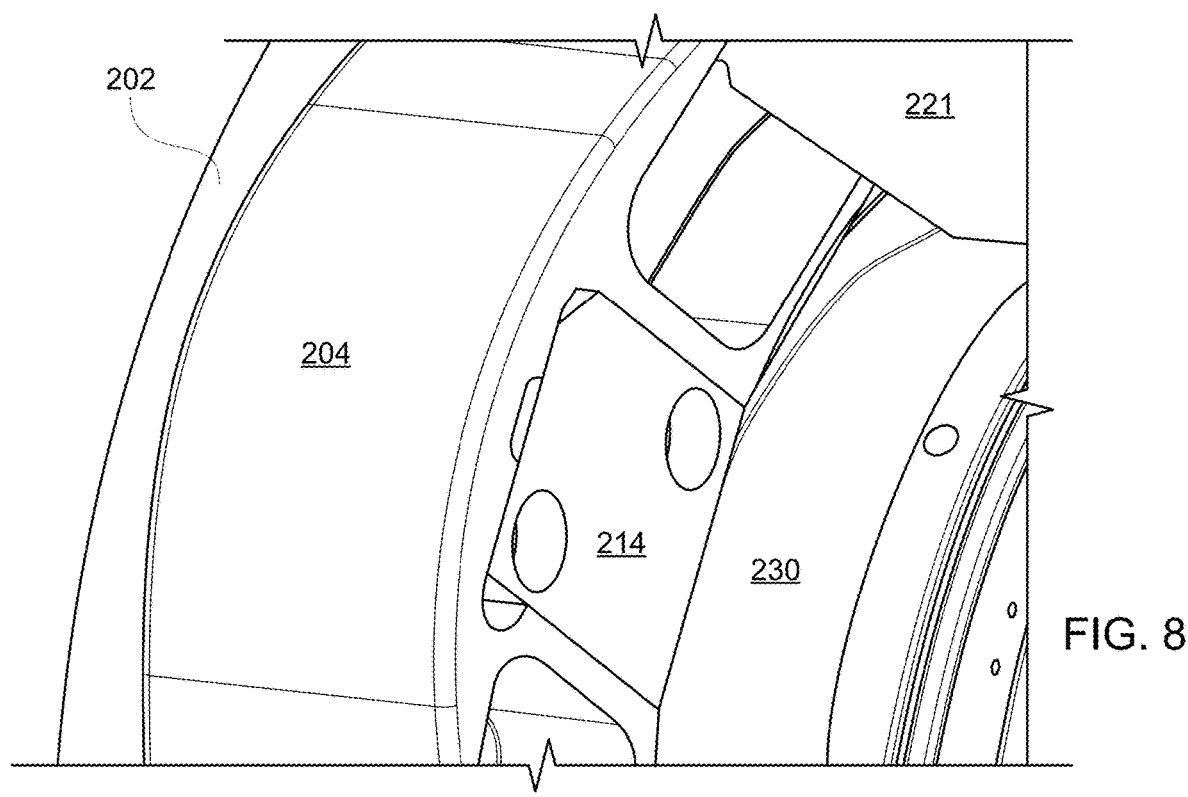
FIG. 8 shows a perspective view of some components of the bearing structure of FIG. 2, centered on one flexure, in accordance with some embodiments of the present disclosure.

FIG. 8 shows a perspective view of some components of bearing structure 200, centered on flexure 214, in accordance with some embodiments of the present disclosure. The partial assembly of FIG. 8 shows front plate 202, support block 204, flexure 214 only (e.g., a pitch hinge), hub 221 only, and sleeve 230. Flexure 214 (e.g., having a pitch hinge) mounts directly and rigidly to front plate 202 and to support block 204. As illustrated, the pitch hinge(s) passes through the axial front (e.g., axially away from stator 250) of support block 204 and mounts to front plate 202 (e.g., but not the stator assembly).

Figure 9:
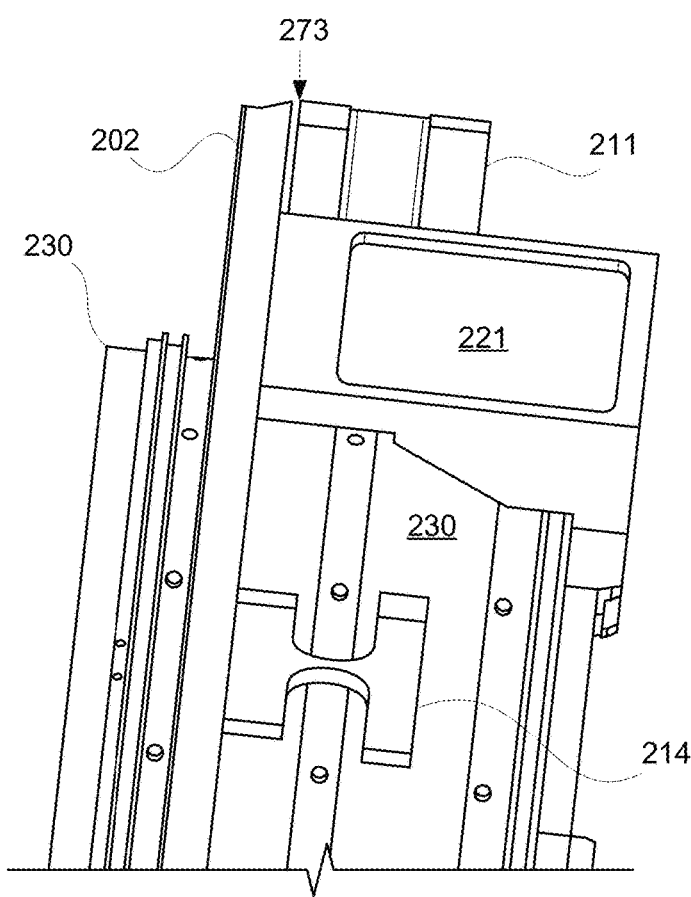
FIG. 9 shows a side view of some components of the bearing structure of FIG. 2, in accordance with some embodiments of the present disclosure.

FIG. 9 shows a side view of some components of bearing structure 200, in accordance with some embodiments of the present disclosure. As illustrated, unlike flexure 214 (e.g., having the pitch hinge), flexure 211 (e.g., having the yaw hinge(s)) does not itself connect to front plate 202 (e.g., gap 273 is at the interface).

Figure 10:
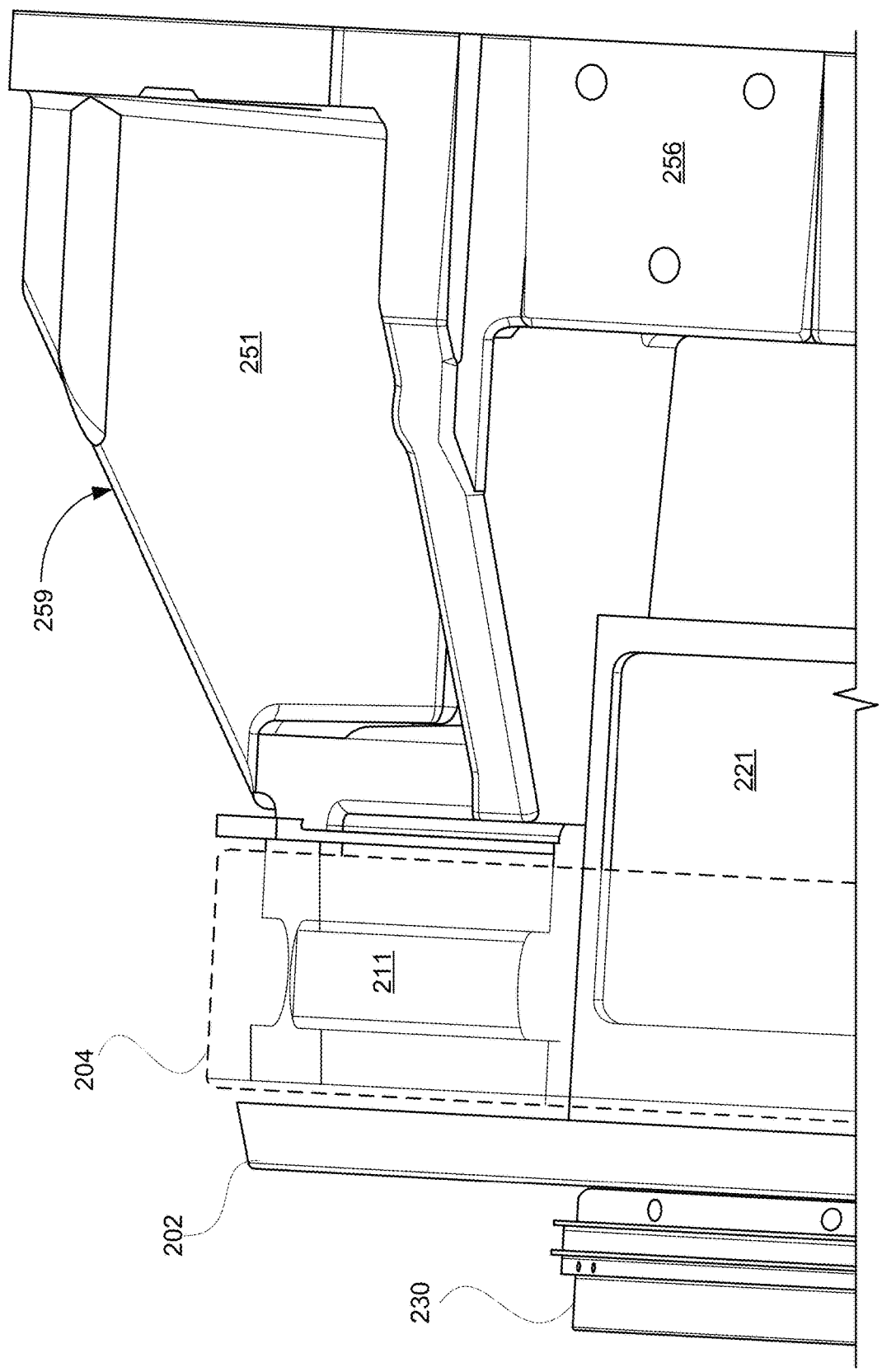
FIG. 10 shows a side view of a portion of the bearing structure of FIG. 2 arranged as part of a stator assembly, in accordance with some embodiments of the present disclosure.

FIG. 10 shows a side view of a portion of bearing structure 200 arranged as part of a stator assembly, in accordance with some embodiments of the present disclosure. As illustrated, flexures 211 and 213 (e.g., designated as yaw hinges) mount (i) to the end bell of stator mount 251 (e.g., of component 259), which is hard mounted to stator 250 at an axial inboard side (e.g., a rear side) and also (ii) to support block 204 at its (axially) front end. Flexures 211 and 213 (e.g., having yaw hinges) do not mount to front plate 202 because this would over-constrain pitch. To illustrate, front plate 202 can pitch independent of support block 204. Flexures 211 and 213 (e.g., having yaw hinges) pass through the back of support block 204 (e.g., with clearance for flexing) and also mount to the front of support block 204.

Figure 11:
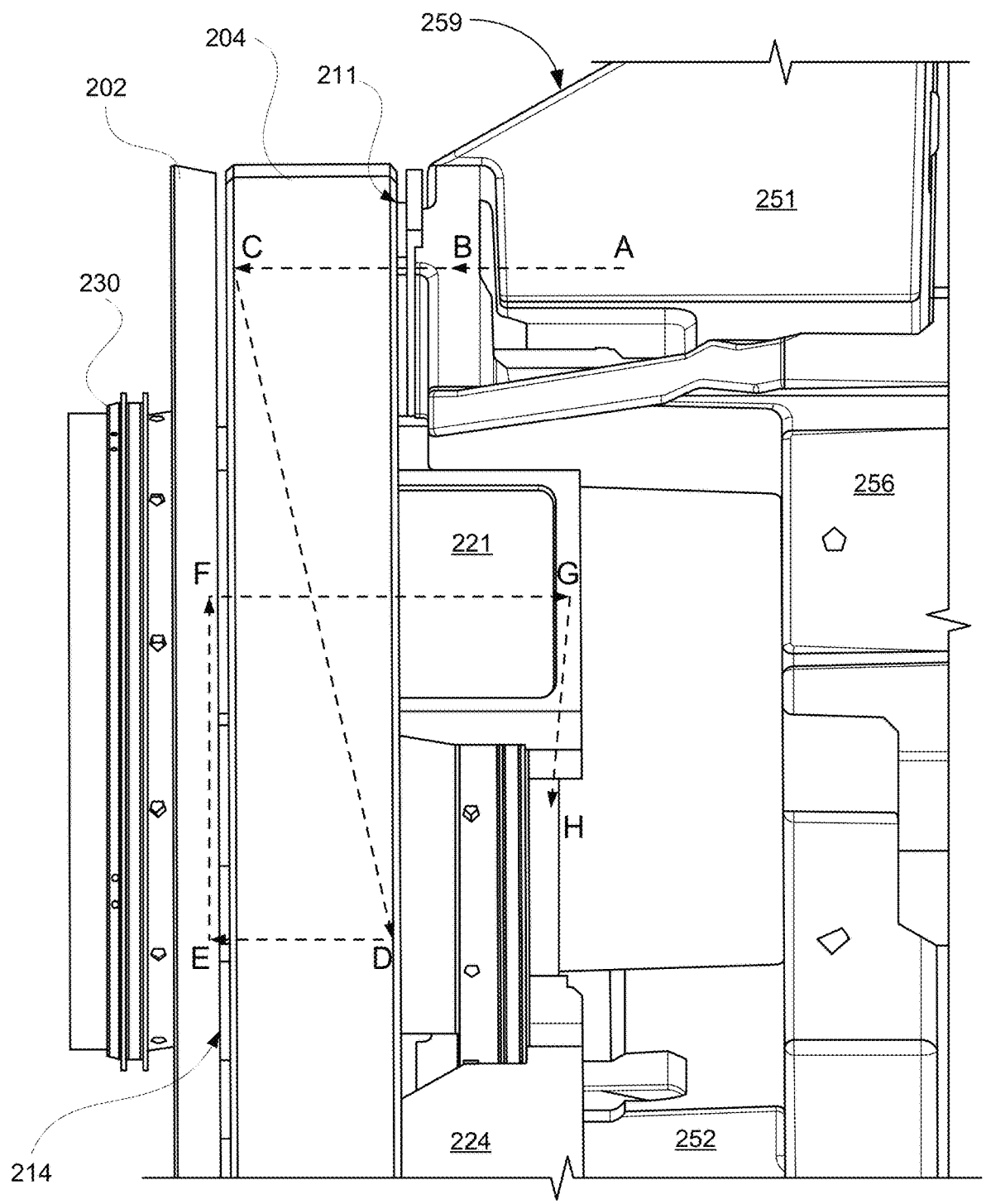
FIG. 11 shows a side view of a portion of the bearing structure of FIG. 2 arranged as part of a stator assembly, with a load path indicated, in accordance with some embodiments of the present disclosure.

FIG. 11 shows a side view of a portion of bearing structure 200 arranged as part of a stator assembly, with a load path indicated to illustrate the connectivity of the various components, in accordance with some embodiments of the present disclosure. As illustrated by the dashed line in FIG. 10, the load path from the stator to the sleeve 230 (bearing) includes:

A-B: stator mount 251 (e.g., an end bell of the LEM) to flexure 211 (e.g., a yaw flexure);
B-C: flexure 211 to front of support block 204;
C-D: support block 204 to rear of flexure 214 (e.g., a pitch flexure);
D-E: flexure 214 to front plate 202;
E-F: front plate 202 to the front of hub 221;
F-G: within hub 221 front to rear (axially); and
G-H: rear of hub 221 to sleeve 230.

The deflection of the arrangement of FIGS. 2-11 may be further described with reference to three states of deflection: (i) yaw-only, (ii) pitch-only and (iii) combined pitch and yaw. In yaw-only deflection, for example, support block 204 rotates in yaw relative to stator mount 251 based on bending deflection of flexures 211 and 213 (e.g., yaw flexures), which is are attached between stator mount 251 and the front of support block 204. The front plate 202, being attached to support block 204 via the pitch flexures 212 and 214, articulates along with the support block 204 (e.g., staying parallel to support block 204) because, in this illustrative scenario, the pitch flexures are not in bending deflection. As such, sleeve 230, being attached to the front plate 202 via relatively rigid hub 221, articulates to the same degree of yaw as support block 204.

In pitch-only deflection, for example, support block 204 remains in plane, that is, flexures 211 and 213 (e.g., yaw flexures) are not in bending deformation. However, front plate 202 may articulate in pitch based on deflection of flexures 212 and 214 (e.g., yaw flexures), which attach between front plate 202 and support block 204, and which, in this scenario, is not deflected. As such, sleeve 230, being attached to front plate 202 via relatively rigid hub 221, articulates to the same degree of pitch as front plate 202.

In combined pitch and yaw deformation, for example, support block 204 articulates in yaw as described above, that is, via deformation of flexures 211 and 213, while front plate 202 articulates in pitch, also as described above, via deformation of flexures 212 and 214. The result is that the pitch deflection of front plate 202 is superimposed on the yaw deflection of support block 204, resulting in a combined deflection of pitch and yaw for sleeve 230, enabling sleeve 230 to deflect to any suitable combined angle of pitch and yaw within the elastic limits of the flexures.

Figure 12:
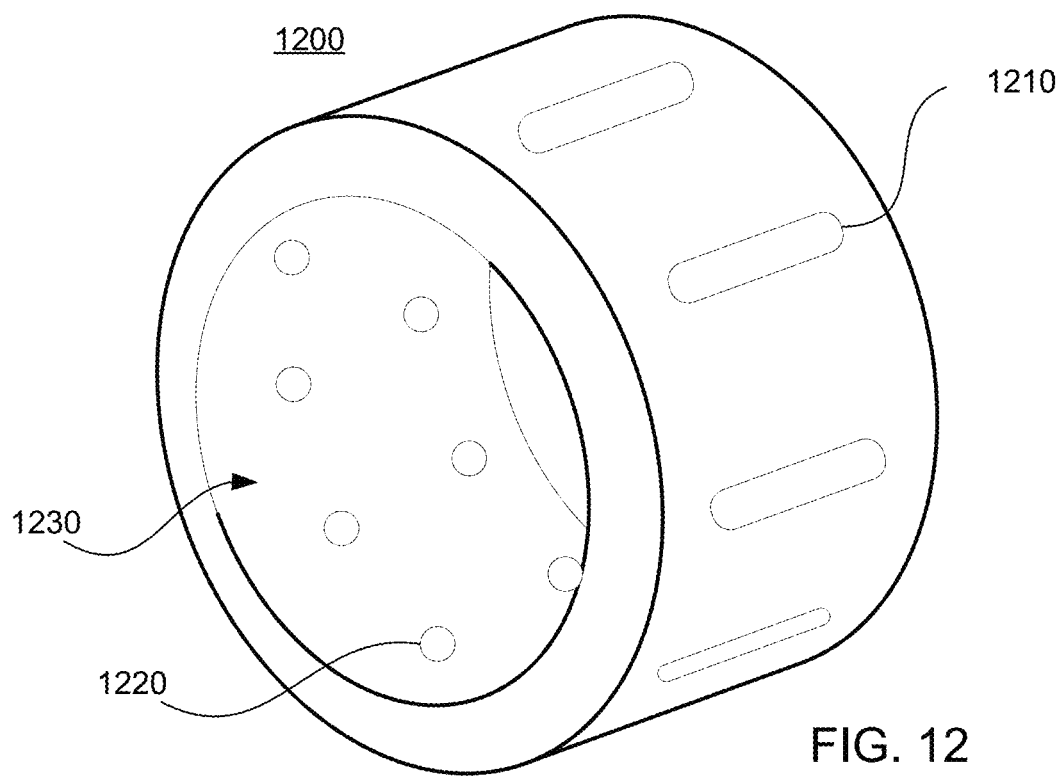
FIG. 12 shows a perspective view of an illustrative bearing housing, in accordance with some embodiments of the present disclosure.

FIG. 12 shows a perspective view of illustrative bearing housing 1200, in accordance with some embodiments of the present disclosure. For example, bearing housing 1200 may be formed by one or more sleeves (e.g., sleeves 230 and 231), which may be sealed together by O-rings, gaskets, sealant, or any other suitable seals. As illustrated, bearing housing 1200 is configured to extend azimuthally around a translator having a circular bearing surface. In some embodiments, bearing housing 1200 may include one or more azimuthal, radial, or axial pieces that may be assembled to form a complete bearing housing. As illustrated, bearing housing 1200 is configured to accommodate a gas bearing, and includes passages 1210 and flow restrictions 1220. Passages 1210 direct and distribute flow of bearing gas within bearing housing 1200 to flow restrictions 1220. Passages 1210 may include, for example, plenums, channels, manifolds, filters, drilled holes, machines recesses, flow control features, ports for sensors (e.g., to sense bearing gas pressure, flow or temperature), ports for receiving a supply of bearing gas, ports for removing condensate (e.g., condensed water, oil, or other condensed fluids), any other suitable features, or any combination thereof. Flow restrictions 1220 are configured to provide the bearing gas to the bearing interface (e.g., a bearing gap) at bearing bore 1230. Flow restrictions 1220 provide bearing gas at a desired pressure and flow rate to the gas bearing, which provides lateral stiffness to off-axis motion of the translator. Flow restriction 1220 may include, for example, orifices, porous sections, or both, or any other suitable flow-restricting features. For example, in some embodiments, flow restrictions 1220 include an array of orifices along bearing bore 1230. In some embodiments, flow restrictions 1220 include a thickness of porous material along bearing bore 1230. In some embodiments, bearing housing 1200 may include a coating, a consumable layer, a dry film lubricant, an abradable coating, or a combination thereof, at bearing bore 1230 to accommodate, for example, contact with a translator.

Although bearing housing 1200 is shown in FIG. 12 as having a cylindrical bearing bore 1230, a bearing housing may include any suitable surface for creating a bearing interface. For example, a bearing housing may include a semi-circular surface, a flat surface, a non-circular curved surface, a piecewise flat or curved surface, any other suitable continuous, piecewise, or segmented surface, or any combination thereof. For example, a bearing housing may include more than one cylindrical surfaces, separated axially, for forming respective bearing interfaces. In a further example, a LEM may include, at a particular axial region, a set of three, four, or more bearing housings having flat surfaces and forming respective bearing interfaces with corresponding flat surfaces of a translator (e.g., a translator having a triangular, rectangular, or other polygonal cross-section). In some embodiments, a bearing housing need not include passages 1210 or flow restrictions 1220. For example, a bearing housing may be configured as a contact slide bearing, with a low-friction coating applied at bearing bore 1230.

Figure 13:
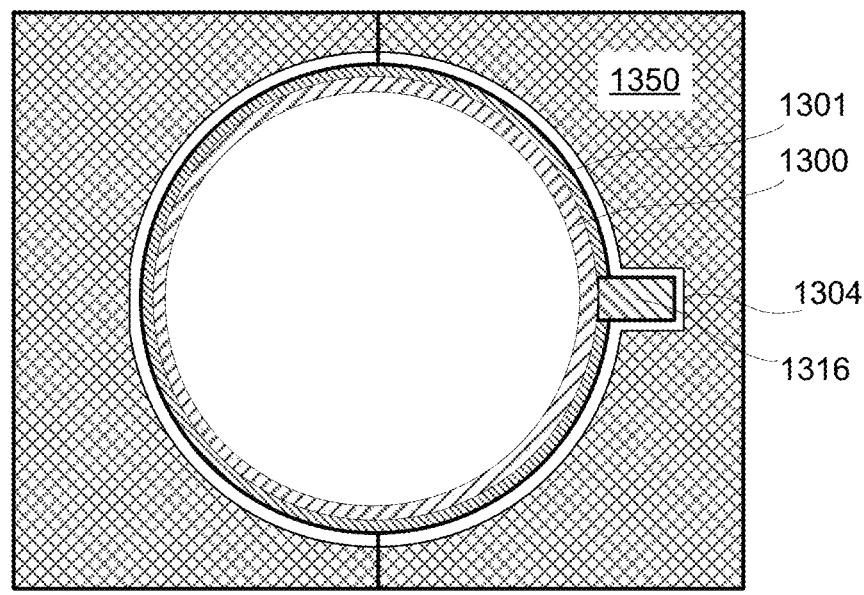
FIG. 13 shows a cross-sectional view of an illustrative translator and bearing housing, in accordance with some embodiments of the present disclosure.

FIG. 13 shows cross-sectional view of translator 1300 and bearing housing 1350, in accordance with some embodiments of the present disclosure. In some embodiments, bearing housing 1350 may include one or more reliefs 1304 to accommodate rail 1316 during axial motion of translator 1300 (e.g., when rail 1316 is axially coincident or otherwise overlapping with bearing housing 1350). As shown in FIG. 13, gas bearing 1301 arranged radially between bearing housing 1350 and translator 1300 does not extend into one or more reliefs 1304. In some embodiments (not shown), a gas bearing arranged radially between bearing housing 1350 and translator 1300 does extend into one or more reliefs 1304. In some embodiments, bearing housing 1350 is of clamshell-type construction, as illustrated, wherein two components mate together to form the complete bearing housing 1350, as shown in FIG. 13. In some embodiments, a bearing housing may be constructed of a single azimuthally continuous housing (e.g., as illustrated in FIG. 12). It should be noted that for clarity and ease of illustration the drawings of the present patent application are not necessarily drawn to scale and do not reflect the actual or relative size of each feature. A bearing housing may be any suitable shape such as, for example, round, rectangular, polygonal, curved, or any other shape including a single segment or more than one segment. Although shown as cylindrical in the present disclosure, a translator "tube" may include any suitable cross-sectional shape or cross-sectional shape profile along its axial length. For example, a translator tube may include an outer surface that is a bearing surface, and the bearing surface may be flat, round, curved, segmented, or any other suitable profile at which a bearing gap may be formed to contain a gas bearing.

Figure 14:
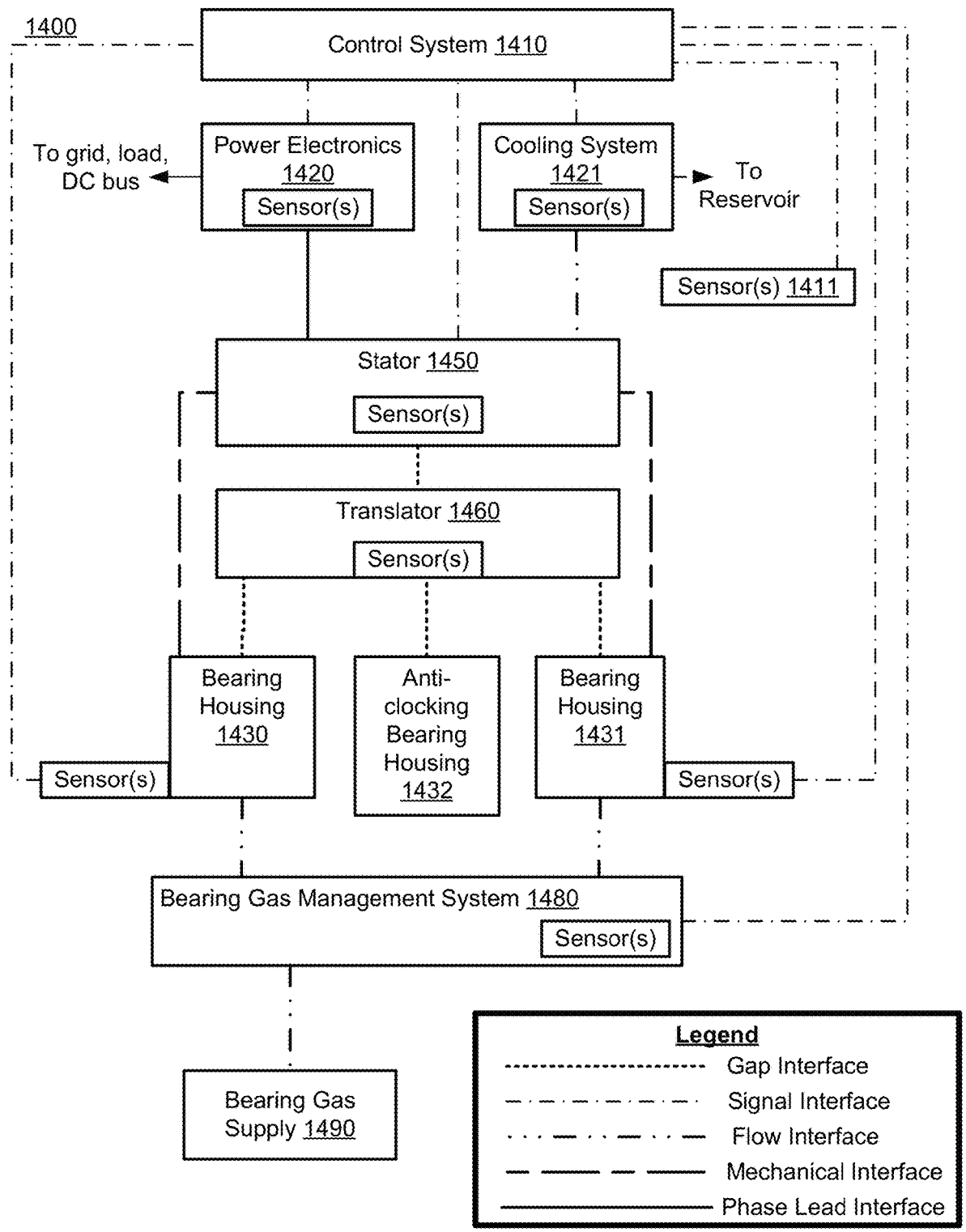
FIG. 14 shows a block diagram of an illustrative LEM system, in accordance with some embodiments of the present disclosure.

FIG. 14 shows a block diagram of illustrative LEM system 1400, in accordance with some embodiments of the present disclosure. LEM system 1400, as illustrated, includes control system 1410, power electronics 1420, cooling system 1421, sensors 1411, stator 1450, translator 1460, bearing housings 1430 and 1431, bearing gas management system 1480, and bearing gas supply 1490. Components of LEM system 1400 are coupled, as illustrated, by a gap interface, signal interface, flow interface, mechanical interface, phase lead interface, or a combination thereof. For example, translator 1460 is coupled to stator 1450 by a gap interface (e.g., a motor air gap), bearing housing 1430 by a gap interface (e.g., a bearing interface such as a gas bearing), and bearing housing 1431 by a gap interface (e.g., a bearing interface such as a gas bearing).

Control system 1410 is configured to interface with (e.g., provide control signals to, receive feedback from) power electronics 1420 to control currents in phases of stator 1450. Power electronics 1420 is coupled to stator 1450 by a plurality of phase leads, which may include lengths of electrically conductive material, electrical terminals and terminations, connectors, sensors (e.g., current sensors), any other suitable components, or any combination thereof. Control system 1410 is configured to interface with (e.g., provide control signals to, receive feedback from) cooling system 1421 to control cooling of stator 1450 (e.g., to remove heat from windings, stator teeth, hoops, or a combination thereof). For example, cooling system 1421 may include one or more cooling jackets, plenums, manifolds, pumps, compressors, filters, sensors, any other suitable components, or any combination thereof. In a further example, cooling system 1421 may exchange heat and fluid with a reservoir (e.g., the environment provides cooling air and accepts heated air). In a further example, control system 1410 may be communicatively coupled to cooling system 1421 and is configured to provide a control signal to cooling system 1421 to cause heat removal from a plurality of windings of stator 1450. Control system 1410 is configured to interface with (e.g., provide control signals to, receive sensor signals from) sensors 1411, which may include, for example, temperature sensors, pressure sensors, vibration sensors, position sensors, current sensors, voltage sensors, any other suitable sensors, or any combination thereof.

Bearing housings 1430 and 1431 may include any suitable number and type of bearing housing, in accordance with the present disclosure. As illustrated, bearing housings 1430 and 1431 are configured for gas bearings (e.g., using bearing gas management system 1480 and bearing gas supply 1490), although a LEM system may include any suitable type of bearing (e.g., contact or non-contact). In some embodiments, one or more sensors are coupled to each of bearing housings 1430 and 1431, configured to sense, for example, bearing gas pressure, bearing gas temperature, bearing gas flow rate, bearing housing acceleration (e.g., an accelerometer may be affixed to a bearing housing to measure vibration), bearing housing temperature, any other suitable property or behavior, or any combination thereof.

Bearing gas management system 1480 is configured to control at least one aspect of respective bearing gas provided to bearing housings 1430 and 1431. For example, bearing gas management system 1480 may include one or more filters, compressors, pumps, pressure regulators, valves, sensors, any other suitable components, or any combination thereof for providing bearing gas to bearing housings 1430 and 1431. For example, control system 1410 is configured to interface with (e.g., provide control signals to, receive feedback from) bearing gas management system 1480 for controlling at least one property of the bearing gas. In a further example, control system 1410 is configured to interface with (e.g., provide control signals to, receive feedback from) bearing gas management system 1480 for controlling a stiffness of the bearing interface (e.g., to lateral displacement of translator 1460) between translator 1460 and bearing housings 1430 and 1431. Bearing gas supply 1490 may include one or more filters, compressors, pumps, pressure regulators, valves, sensors, any other suitable components, or any combination thereof for providing bearing gas to bearing gas management system 1480. In some embodiments, bearing gas management system 1480 and bearing gas supply 1490 may be combined as a single system. In some embodiments, bearing gas supply 1490 need not be included (e.g., bearing gas management system 1480 may intake atmospheric air).

In some embodiments, stator 1450 includes a plurality of coils and an axis; translator 1460 is arranged to move axially along the axis; and bearing housing 1430, bearing housing 1431, or both are coupled to stator 1450 to constrain lateral motion of translator 1460. For example, the coils include windings that interface with a plurality of stator teeth that define an axis (e.g., an axis of a stator bore). In some such embodiments, control system 1410 is configured to control axial displacement of translator 1460, and control lateral displacement of translator 1460. For example, bearing housing 1430, bearing housing 1431, or both, and translator 1460 form a bearing interface, and control system 1410 is configured to control a stiffness of the bearing interface against the lateral displacement of translator 1460. In an illustrative example, the bearing interface may include a gas bearing interface configured for oil-less operation (e.g., without the use of liquid lubricant).

In some embodiments, bearing gas management system 1480 is configured to provide a pressurized gas to the bearing interface. In some such embodiments, control system 1410 is communicatively coupled to bearing gas management system 1480 and is configured to provide a control signal to bearing gas management system 1480 to cause the pressurized gas to be provided to the bearing interface. For example, control system 1410 may cause bearing gas management system 1480 to control a property of the pressurized gas to control the lateral stiffness to lateral displacement of the translator. To illustrate, bearing gas management system 1480 may provide a pressurized gas to the bearing gap by opening a valve. To further illustrate, bearing gas management system 1480 may provide pressurized gas by controlling a valve, a pressure regulator, or both. Bearing gas may be provided by a compressor, a driver section, any other suitable source of pressurized gas, or any combination thereof.

In some embodiments, power electronics 1420 are coupled to a plurality of windings of stator 1450. Control system 1410 is communicatively coupled to power electronics 1420 and is configured to provide a control signal to power electronics 1420 to cause electrical current to flow in at least one winding of the plurality of windings to control the axial displacement of translator 1460.

In some embodiments, one or more sensors of LEM system 1400 include a position sensor that senses an axial position of translator 1460 relative to stator 1450. In some such embodiments, control system 1410 is communicatively coupled to the sensor (e.g., of sensors 1411) and is configured to cause electrical current to flow in the plurality of windings of stator 1450 based on the axial position of translator 1460. In some embodiments, control system 1410 is configured to estimate an axial position of translator 1460 relative to stator 1450 and cause electrical current to flow in the plurality of windings of stator 1450 based on the axial position of translator 1460.

In some embodiments, translator 1460 includes at least one rail having a rail surface. System 1400 may optionally include at least one anti-clocking bearing housing (e.g., bearing housing 1432) coupled to stator 1450 and configured to constrain azimuthal motion of translator 1460, wherein anti-clocking bearing housing 1432 and the rail surface form a rail interface. For example, control system 1410 is configured to cause the rail interface to achieve a stiffness against azimuthal motion of the translator.

In some embodiments, bearing housing 1430 is arranged on a first longitudinal side of stator 1450 to constrain the lateral motion of translator 1460 at the first longitudinal side of stator 1450, and bearing housing 1431 is arranged on a second longitudinal side of stator 1450 to constrain the lateral motion of translator 1460 at the second longitudinal side of stator 1450.

In some embodiments, control system 1410 is configured to control a LEM by causing electric current to flow in at least one winding of a plurality of windings of a stator to apply a force on a translator along a longitudinal axis of the stator, and controlling lateral stiffness to lateral displacement of the translator arranged to move along a longitudinal axis of the stator. For example, the translator and the stator may form a motor air gap, and the lateral stiffness provided by the bearings is capable of maintaining the motor air gap in an operable range. For example, causing electric current to flow in at least one winding may include providing a control signal to power electronics 1420 that are electrically coupled to the plurality of windings.

In some embodiments, control system 1410 is configured to monitor a property of the bearing gas, bearing housing, or both, for a fault condition and, in response to an identification of the fault condition, brake translator 1460. For example, control system 1410 may brake translator 1460 by causing power electronics 1420 to apply currents to phases of stator 1450 that cause a force on translator 1460 that oppose motion of translator 1460 (e.g., thus reducing a velocity of, or even stopping, translator 1460). To illustrate, control system 1410 may monitor a mass flowrate of bearing gas, a pressure of bearing gas, a temperature of bearing gas, a temperature of a bearing housing, a vibration of a bearing housing, a force load on a bearing housing, a translator position trajectory, or a combination thereof.

FIG. 15 shows a cross-sectional view of illustrative generator assembly 1500, in accordance with some embodiments of the present disclosure. Generator assembly 1500 is configured as an opposed, free-piston generator. Generator assembly 1500 includes translators 1510 and 1520, which are configured to move along axis 1506 (e.g., translate linearly along axis 1506). Translators 1510 and 1520 are configured to move within cylinders 1502, 1504 and 1505, thus forming expansion and compression volumes 1597, 1598, and 1599 for performing boundary work (e.g., determined using the integral ∫PdV over a suitable range such as a stroke or cycle). For clarity, the spatial arrangement of the systems and assemblies described herein will generally be referred to in the context of cylindrical coordinates, having axial, radial, and azimuthal directions. It will be understood that any suitable coordinate system may be used (e.g., cylindrical coordinates may be mapped to any suitable coordinate system), in accordance with the present disclosure. Note that axis 1506 is directed in the axial direction, and the radial direction is defined as being perpendicular to axis 1506 (e.g., directed away from axis 1506). The azimuthal direction is defined as the angular direction around axis 1506 (e.g., orthogonal to both axis 1506 and the radial direction, and directed around axis 1506). As illustrated, generator assembly 1500 includes driver sections 1550 and 1558, linear motors (e.g., LEMs) 1552 and 1556, and central cylinder region 1554. Axis 1507 corresponds to the center of generator assembly 1500, about which translators 1510 and 1520 translate (e.g., in equal and opposite motions).

In some embodiments, the stationary components of generator assembly 1500 include cylinder 1502, cylinder 1504, cylinder 1505, stator 1518, stator 1528, bearing housing 1516, bearing housing 1517, bearing housing 1526, and bearing housing 1527. In some embodiments, bearing housings 1516 and 1517 are coupled to stator 1518 (e.g., either directly connected, or coupled by an intermediate component such as a hinge, mount, or both). For example, bearing housings 1516 and 1517 may be aligned to (e.g., laterally or axially aligned), and affixed to, stator 1518 to maintain a radial air gap between magnet assembly 1513 and stator 1518. Similarly, in some embodiments, bearing housings 1526 and 1527 are rigidly coupled to stator 1528. In a further example, in some embodiments, bearing housing 1526 and 1527 are aligned to stator 1518, but affixed to another portion of a generator assembly or components thereof. Each of the bearing housings may be part of bearing structure 200 or any other suitable bearing structure, and may be coupled to stators 1518 and 1528 in accordance with any of the bearing structures of the present disclosure (e.g., bearing structure 200 of FIGS. 2-11).

Translator 1510 includes tube 1512, piston 1511, piston 1514, and magnet assembly 1513, all substantially rigidly coupled to move as a substantially rigid body along axis 1506, relative to the stationary components. Translator 1520 includes tube 1522, piston 1521, piston 1524, and magnet assembly 1523, all substantially rigidly coupled to move as a substantially rigid body along axis 1506. In some embodiments, magnet assemblies 1513 and 1523 may be a region of tubes 1512 and 1522, respectively. In some embodiments, magnet assemblies 1513 and 1523 may include separate components affixed to tubes 1512 and 1522, respectively. Reaction section 1597 is bounded by pistons 1511 and 1521, as well as bore 1503 of cylinder 1502. Gas springs 1598 and 1599 are bounded by respective pistons 1514 and 1524, as well as respective cylinders 1504 and 1505. Accordingly, as translators 1510 and 1520 move along axis 1506, the volumes of reaction section 1597, gas spring 1598, and gas spring 1599 expand and contract. Further, for example, pressures within those volumes decrease or increase as the volume increases or decreases, respectively. Each of bearing housings 1516, 1517, 1526, and 1527 is configured to provide a gas bearing between itself and the corresponding translator (e.g., tubes 1512 and 1522). For example, each of bearing housings 1516, 1517, 1526, and 1527 may be configured to direct pressurized gas to the gas bearing (e.g., via a flow system). In an illustrative example, each of bearing housings 1516, 1517, 1526, and 1527 may be configured to direct pressurized gas having an absolute pressure greater than ambient pressure (e.g., 1 atm at sea level) to the gas bearing such that the bearing gas has sufficient pressure to flow through the gas bearing and into the environment (e.g., directly or via other ducting). In some embodiments, bearing gas may be pressurized relative to the environment (e.g., about 1 atm), a pressure in a breathing system (e.g., a boost pressure, or a gas pressure in an exhaust system that may be greater than or less than 1 atm), or any other suitable pressure reference. In some embodiments, generator assembly 1500 is configured for oil-less operation (e.g., without the use of lubricating liquids or without the use of solid-to-solid contact bearings), with bearing housings 1516, 1517, 1526, and 1527 forming gas bearings against translators 1510 and 1520. Cylinder 1502 includes bore 1503, which houses compression section 1597. Cylinder 1502 also includes illustrative ports 1519 and 1529, which couple bore 1503 to the outside of cylinder 1502 to allow fluid exchange.

Stator 1518, magnet assembly 1513, tube 1512, and bearing housings 1516 and 1517 form linear electromagnetic machine (LEM) 1556. Similarly, stator 1528, magnet assembly 1523, tube 1522, and bearing housings 1526 and 1528 form LEM 1552. Further, a LEM may optionally include one or more pistons affixed to the translator. For example, a LEM may be defined to include stator 1518, translator 1510, and bearing housings 1516 and 1517. In a further example, a LEM may be defined to include stator 1528, translator 1520, and bearing housings 1526 and 1527. A LEM includes a stationary assembly (e.g., a stator and bearing housings) and a translating assembly (e.g., a translator) that is constrained to move along an axis, wherein the stator is capable of applying an electromagnetic force on the translator to cause and/or effect motion along the axis. The bearing housings of a LEM may be, but need not be, affixed to the stator. For example, the bearings housings may be coupled to the stator, a structural frame, a cylinder, either directly or by one or more intervening components, or any combination thereof. Stators 1518 and 1528 may include a plurality of phase windings, which form a plurality of phases. The current in each of the phases may be controlled by a control system (e.g., which may include corresponding power electronics and processing equipment) to affect the position of translators 1510 and 1520 or motion of translators 1510 and 1520 or work interactions with translators 1510 and 1520, or any combination thereof. In some embodiments, magnet assemblies 1513 and 1523 include permanent magnets arranged in an array (e.g., of alternating North and South poles). Because translators 1510 and 1520 move as substantially rigid assemblies, electromagnetic forces applied to respective magnet assemblies 1513 and 1523 accelerate and decelerate translators 1510 and 1520. In some embodiments, stators 1518 and 1528 may be air-cooled (e.g., by an air cooling system), liquid-cooled (e.g., by a liquid cooling system), or both. In some embodiments, stators 1518 and 1528 are arranged around respective translators 1510 and 1520, or respective magnet assemblies 1513 and 1523 thereof (e.g., the motor air gap is arcuate with a thickness profile). For example, stators 1518 and 1528 may extend fully around (e.g., 360° azimuthally around) or partially around (e.g., having azimuthally arranged segments and azimuthally arranged gaps between windings of a phase) respective translators 1510 and 1520. In some embodiments, stators 1518 and 1528 are arranged axially along respective translators 1510 and 1520, or respective magnet assemblies 1513 and 1523 thereof. For example, magnet assemblies 1513 and 1523 may include flat magnet sections, and stators 1518 and 1528 may include flat surfaces that correspond to the magnet sections (e.g., the motor air gap is planar with a thickness profile). In some embodiments, stators 1518 and 1528 extend axially along respective translators 1510 and 1520, or respective magnet assemblies 1513 and 1523 thereof.

Figure 16:
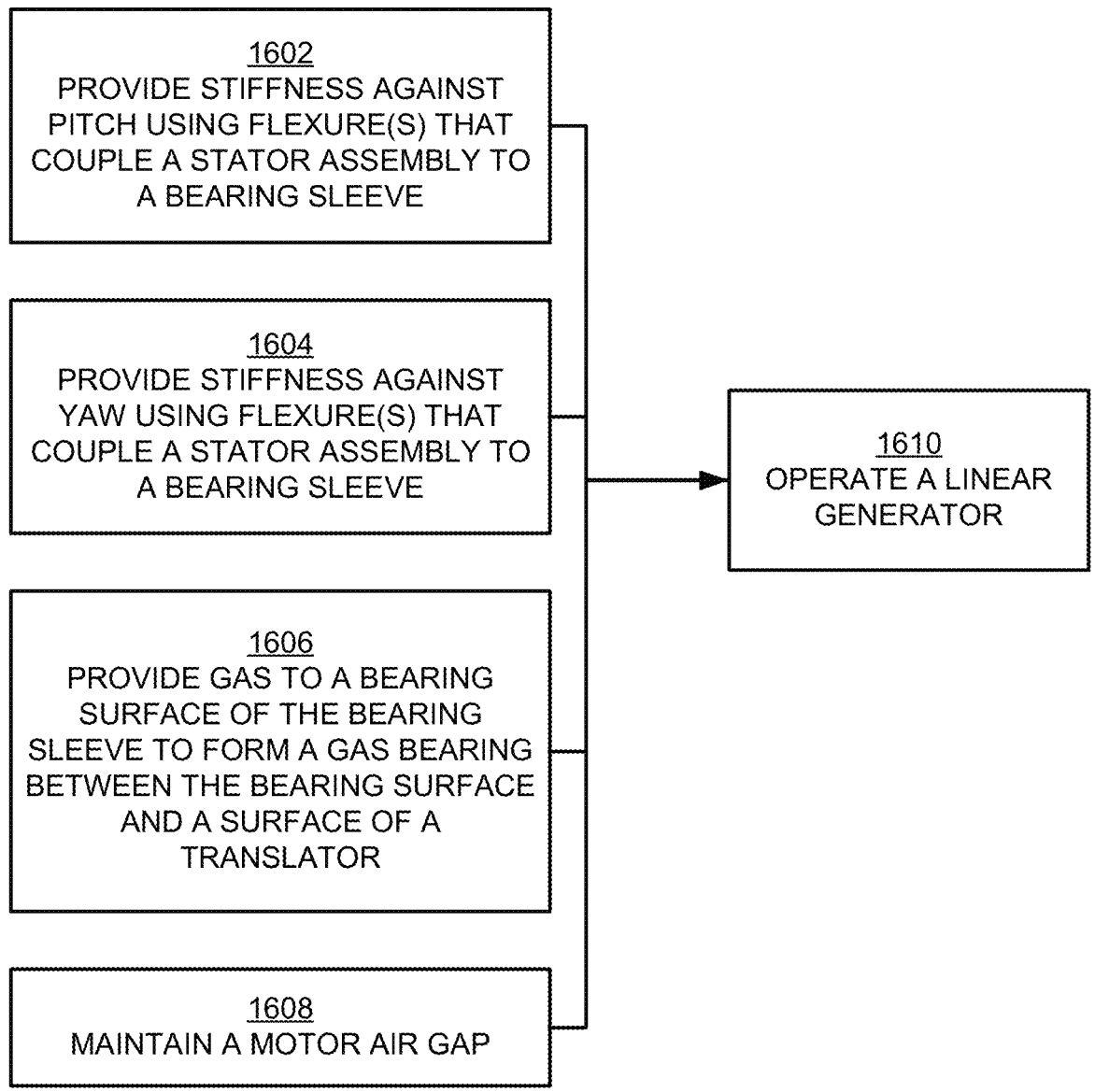
FIG. 16 is a flowchart showing an illustrative process for operating a linear generator having gas bearings, in accordance with some embodiments of the present disclosure.

FIG. 16 is a flowchart showing illustrative process 1600 for operating a linear generator having gas bearings, in accordance with some embodiments of the present disclosure.

Step 1602 may include providing stiffness against pitch using a plurality of flexures, having hinges, that couple a stator assembly to a bearing sleeve, which provides gas to a bearing surface of the bearing sleeve to form a gas bearing between the bearing surface and a surface of a translator, and maintaining a motor air gap using the gas bearing.

Step 1604 may include providing stiffness against yaw using a plurality of flexure(s) that couple a stator assembly to a bearing sleeve. In some embodiments, a linear generator, or LEM thereof may include two bearing structures, each having a plurality of flexures for managing pitch and yaw stiffness.

Step 1606 may include providing gas (e.g., bearing gas such as air) to each bearing structure (e.g., by providing the gas to passages formed by the bearing sleeve and an outer sleeve) to form a gas bearing between respective bearing surfaces and the translator.

Step 1608 may include maintaining a motor air gap. For example, the bearing structure provides a surface to form a gas bearing, which applies force on the translator to in the lateral plane (e.g., to constrain lateral displacement, thus maintaining the motor air gap).

Step 1610 may include operating a linear generator or other suitable linear device. For example, step 1610 may include applying current to one or more phases of a stator (e.g., to apply force on a translator), providing pressurized bearing gas to a gas bearing, sensing one or more operating characteristics (e.g., translator position, bearing gas pressure, any other suitable characteristics), any other suitable action, or any combination thereof.

To illustrate, the bearing structures of the present disclosure may exhibit or achieve any or all of the following:

(i) elimination of thermal-pinch-related bearing failures, where a disc hinge or other designs (e.g., not using the L-bracket hub sections), may have issues with thermal over-constraint;

(ii) reduced-amplitude axial vibrations on the encoder signal, at a high enough frequency that they can be safely discarded from control algorithms;

(iii) long-term robustness and reliability over thousands of hours of operation and hundreds of startups and shutdowns;

(iv) an ability to enable in-situ bearing sleeve replacements; and (v) large axial stiffness that provides an ability to achieve "air-off startups" where the bearings are permitted to rub very briefly while the system (e.g., linear generator) pumps itself up to an operating pressure. Designs with lower axial stiffness and/or "stiction" in a self-aligning joint could have more trouble operating in this mode (e.g., during startup).

Figure 17:
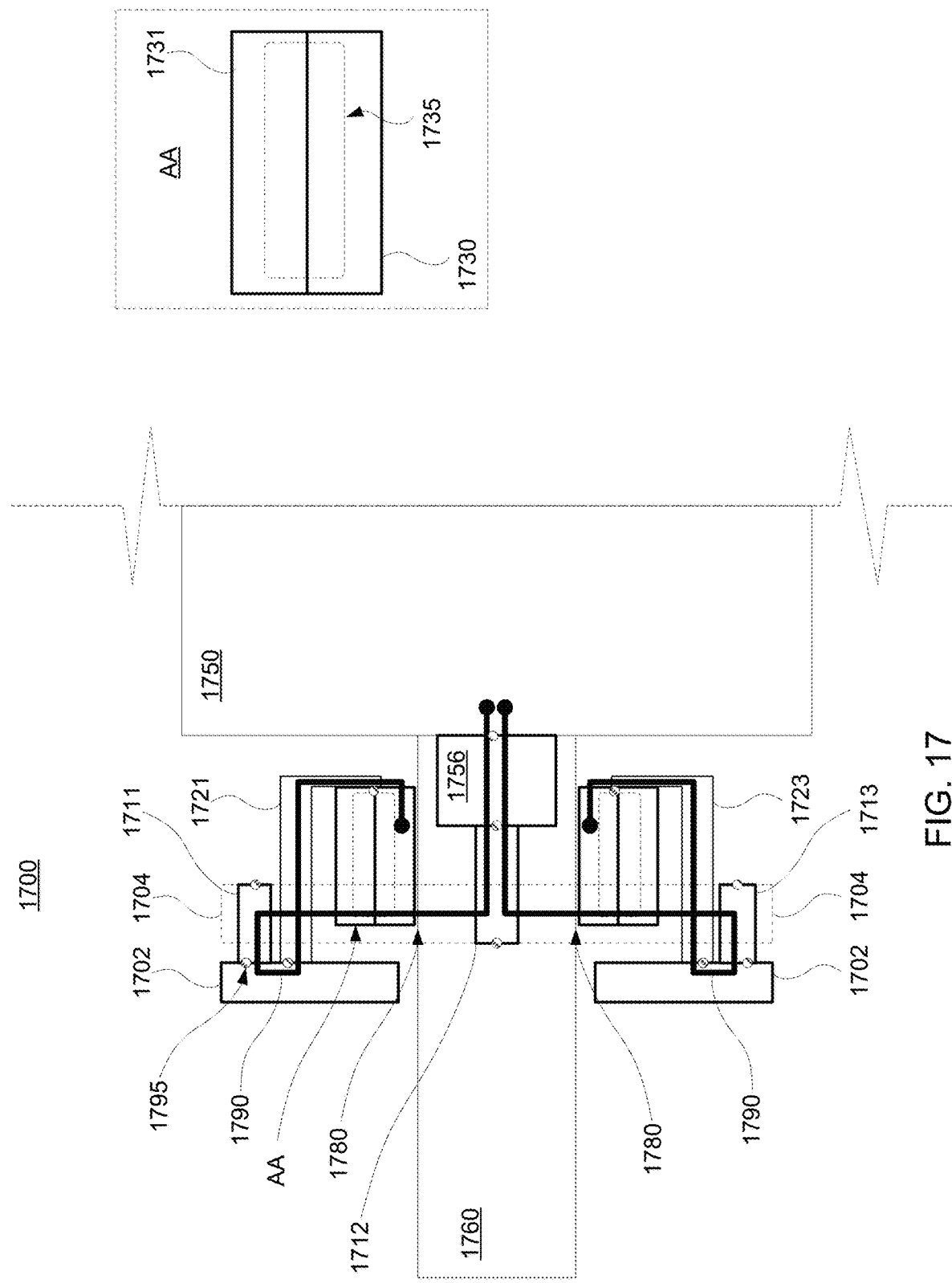
FIG. 17 shows a side cross-sectional side view of a portion of an illustrative generator assembly having a bearing structure, in accordance with some embodiments of the present disclosure.

FIG. 17 shows a side cross-sectional side view of a portion of illustrative generator 1700 assembly having a bearing structure, in accordance with some embodiments of the present disclosure. As illustrated, the bearing structure includes front plate 1702, support block 1704 (e.g., shown as dash-dotted for purposes of illustration), flexures 1711, 1712, and 1713 (e.g., each including a hinge and mounting features), hubs 1721 and 1723, and sleeves 1730 and 1731 (e.g., inner and outer sleeves having a surface for providing a gas bearing in gap 1780). Enlargement AA, showing sleeves 1730 and 1731 (e.g., an recess 1735) is included for purposes of clarity. Generator assembly 1700 includes at least one bearing structure, as illustrated, at least one stator (e.g., stator 1750 configured to interact with translator 1760). In generator assembly 1700, there may be a set of load paths between the bearing housing (e.g., sleeves 1730 and 1731, forming recess 1735 for containing bearing gas) and stator 1750. Rigid connections 1795, where components are affixed (e.g., using fasteners, clamps, clips, welds, pins, or any other suitable affixment) and load is transferred among components, are illustrated by small, hashed circles. Illustrative load path 1790 includes paths from:

stator 1750 to stator mount 1756;
stator mount 1756 to flexure 1712;
flexure 1712 to support block 1704 (e.g. an axially forward portion thereof);
support block 1704 to rear of respective flexures 1711 and 1713;

respective flexures 1711 and 1713 to front plate 1702;
front plate 1702 to the front of respective hubs 1721 and 1723;
the front of respective hubs 1721 and 1723 to respective axially rear portions; and
the rear portions of respective hubs 1721 and 1723 to the bearing housing.

It will be understood that the present disclosure is not limited to the embodiments described herein and can be implemented in the context of any suitable system. In some suitable embodiments, the present disclosure is applicable to reciprocating engines and compressors. In some embodiments, the present disclosure is applicable to free-piston linear generators, engines, and compressors. In some embodiments, the present disclosure is applicable to combustion and reaction devices such as a reciprocating engine, free-piston engine, and linear generator. In some embodiments, the present disclosure is applicable to non-combustion and non-reaction devices such as reciprocating compressors and free-piston compressors. In some embodiments, the present disclosure is applicable to linear reciprocating devices with driver sections (e.g., gas springs). In some embodiments, the present disclosure is applicable to oil-free reciprocating and free-piston engines and compressors. In some embodiments, the present disclosure is applicable to oil-free free-piston engines with internal or external combustion or reactions. In some embodiments, the present disclosure is applicable to oil-free free-piston engines that operate with compression ignition (e.g., homogeneous charge compression ignition (HCCI), stratified charge compression ignition (SCCI), or other compression ignition), spark ignition, or both. In some embodiments, the present disclosure is applicable to oil-free free-piston engines that operate with gaseous fuels, liquid fuels, or both. In some embodiments, the present disclosure is applicable to linear free-piston engines. In some embodiments, the present disclosure is applicable to engines that can be combustion engines with internal combustion/reaction or any type of heat engine with external heat addition (e.g., from a heat source or external reaction such as combustion).

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A bearing assembly for a linear electromagnetic machine (LEM), the bearing assembly comprising:
   a sleeve comprising a surface configured to provide a bearing between the surface and a translator;
   a front plate coupled to the sleeve;
   a support block; and
   a plurality of flexures coupled to the support block, wherein each flexure of the plurality of flexures is coupled between the support block and one of the front plate or a stator, and wherein a load path extends from:
      the stator to the support block via a first set of flexures of the plurality of flexures;
      the support block to the front plate via a second set of flexures of the plurality of flexures; and
      the front plate to the sleeve.

2. The bearing assembly of claim 1, further comprising at least one hub affixing the sleeve to the front plate.

3. The bearing assembly of claim 1, wherein the surface is configured to provide a gas bearing between the surface and the translator during operation.

4. The bearing assembly of claim 1, further comprising an outer sleeve that forms one or more gas passages for providing gas to a gas bearing adjacent to the surface.

5. The bearing assembly of claim 1, the plurality of flexures comprising:
   two first flexures arranged at a first azimuthal position and a second azimuthal position of the bearing assembly and affixed to the support block and to the front plate; and
   two second flexures arranged at a third azimuthal position and a fourth azimuthal position of the bearing assembly and affixed to the support block and the stator.

6. A stator assembly of a linear generator, the stator assembly comprising:
   a stator configured to electromagnetically interact with a translator;
   at least one bearing assembly coupled to the stator, each bearing assembly comprising:
      a plurality of flexures that couple a sleeve to the stator,
      a front plate, and
      a support block, wherein:
         each flexure of the plurality of flexures is coupled between the support block and one of the front plate or the stator;
         each flexure is configured to allow pitch or yaw of the sleeve;
         the sleeve interfaces with the translator, and a load path extends from:
            the stator to the support block via a first set of flexures of the plurality of flexures;
            the support block to the front plate via a second set of flexures of the plurality of flexures; and
            the front plate to the sleeve.

7. The stator assembly of claim 6, wherein:
   the sleeve comprises a surface; and
   the surface interfaces with the translator.

8. The stator assembly of claim 7, wherein the surface provides a gas bearing with the translator during operation.

9. The stator assembly of claim 6, the plurality of flexures comprising:
   two first flexures arranged at a first azimuthal position and a second azimuthal position of the at least one bearing assembly and affixed to the support block and to the front plate; and
   two second flexures arranged at a third azimuthal position and a fourth azimuthal position of the at least one bearing assembly and affixed to the support block and the stator.

10. The stator assembly of claim 6, wherein the bearing assembly further comprises at least one hub affixing the bearing sleeve to the front plate.

11. The stator assembly of claim 6, further comprising an outer sleeve that forms one or more gas passages for providing gas to a gas bearing adjacent to a surface of the sleeve.

12. A linear electromagnetic machine (LEM) comprising:
    a stator comprising a plurality of phases;
    a translator that moves along the stator and electromagnetically interacts with the plurality of phases; and
    at least one bearing assembly coupled to the stator, each bearing assembly comprising a plurality of flexures that couple a sleeve, interfacing to the translator, to the stator, wherein each flexure allows pitch or yaw, wherein the at least one bearing assembly comprises:
a front plate; and
a support block, wherein each flexure of the plurality of flexures is coupled between the support block and one of the front plate or the stator, wherein a load path extends from:
the stator to the support block via a first set of flexures of the plurality of flexures;
the support block to the front plate via a second set of flexures of the plurality of flexures; and
the front plate to the sleeve.

13. The LEM of claim 12, wherein:
the at least one bearing assembly comprises a first bearing assembly and a second bearing assembly;
the first bearing assembly is arranged at a first axial end of the stator; and
the second bearing assembly is arranged at a second axial end of the stator.

14. The LEM of claim 12, wherein the at least one bearing assembly provides at least one gas bearing at a respective interface with the translator.

15. The LEM of claim 7, the plurality of flexures comprising:
two first flexures arranged at a first azimuthal position and a second azimuthal position of the at least one bearing assembly and affixed to the support block and to the front plate; and
two second flexures arranged at a third azimuthal position and a fourth azimuthal position of the at least one bearing assembly and affixed to the support block and the stator.

* * * * *